US012517778B2

(12) United States Patent
Turk et al.

(10) Patent No.: US 12,517,778 B2
(45) Date of Patent: Jan. 6, 2026

(54) SYSTEM, METHOD AND ASSOCIATED COMPUTER READABLE MEDIA FOR FACILITATING MACHINE LEARNING ENGINE SELECTION IN A NETWORK ENVIRONMENT

(71) Applicant: TELEFONAKTIEBOLAGET LM ERICSSON (PUBL), Stockholm (SE)

(72) Inventors: Yekta Turk, Ankara (TR); Omer Haliloglu, Istanbul (TR); Yunus Donmez, Istanbul (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 17/771,458

(22) PCT Filed: Sep. 17, 2020

(86) PCT No.: PCT/IB2020/058646
§ 371 (c)(1),
(2) Date: Apr. 23, 2022

(87) PCT Pub. No.: WO2021/079206
PCT Pub. Date: Apr. 29, 2021

(65) Prior Publication Data
US 2022/0382615 A1 Dec. 1, 2022

Related U.S. Application Data

(60) Provisional application No. 62/925,469, filed on Oct. 24, 2019.

(51) Int. Cl.
G06F 11/07 (2006.01)
G06F 11/30 (2006.01)
(Continued)

(52) U.S. Cl.
CPC ........ G06F 11/079 (2013.01); G06F 11/3006 (2013.01); G06F 11/3428 (2013.01);
(Continued)

(58) Field of Classification Search
USPC .......................................................... 370/200
See application file for complete search history.

(56) References Cited

U.S. PATENT DOCUMENTS

2017/0353991 A1* 12/2017 Tapia ...................... H04L 43/08
2020/0396135 A1* 12/2020 Ma ......................... H04L 45/08
(Continued)

OTHER PUBLICATIONS

D. Rafique, et al., "Machine learning for network automation: overview, architecture, and applications [Invited Tutorial]," in IEEE/OSA Journal of Optical Communications and Networking, vol. 10, No. 10, pp. D126-D143, Oct. 2018.
(Continued)

*Primary Examiner* — Luna Weissberger

(57) ABSTRACT

A system, method and non-transitory computer readable media for effectuating ML-based fault analysis in a network (102A, 102B) comprising a plurality of nodes (104-N, 120-M). An example method (200A) comprises determining (202) that at least one of a topological configuration of the network (102 A, 102B) and one or more key performance indicator (KPI) requirements associated with the network (102A, 102B) have changed; and responsive to the determining, selecting (204) a machine language (ML) engine optimally adapted to facilitate root cause determination of any faults detected in the network (102 A, 102B) after the topological configuration or any KPI requirements of the network (102A, 102B) have changed.

15 Claims, 22 Drawing Sheets

(51) Int. Cl.
　　　*G06F 11/34*　　　(2006.01)
　　　*H04L 41/0631*　　(2022.01)
　　　*H04L 41/0893*　　(2022.01)
　　　*H04L 41/16*　　　(2022.01)
　　　*H04L 41/12*　　　(2022.01)

(52) U.S. Cl.
　　　CPC ...... *H04L 41/0631* (2013.01); *H04L 41/0893* (2013.01); *H04L 41/16* (2013.01); *H04L 41/12* (2013.01)

(56) References Cited

U.S. PATENT DOCUMENTS

| 2020/0401936 | A1* | 12/2020 | Embarmannar Vijayan ................ G06F 11/3452 |
| 2021/0176114 | A1* | 6/2021 | Hsu .................. H04L 41/16 |
| 2021/0279632 | A1* | 9/2021 | Di Pietro ................ G06N 5/04 |

OTHER PUBLICATIONS

Y. Turk et al., "A Machine Learning Based Management System for Network Services", IEEE 15th Int. Conf. on Wireless Mobile Computing, Networking & Communications (WiMob 2019).

* cited by examiner

CATEGORIZING THE PLURALITY OF NODES OF THE NETWORK INTO EDGE NODES, INTERMEDIATE NODES AND CORE NODES BASED ON AT LEAST ONE OF TOPOLOGICAL CONFIGURATION AND PERFORMANCE CAPABILITY OF THE NODES DISPOSED IN THE NETWORK

CLASSIFYING NETWORK TOPOLOGICAL CONFIGURATIONS INTO A PLURALITY OF CLASSES COMPRISING STAR TOPOLOGIES, EXTENDED STAR TOPOLOGIES, RING TOPOLOGIES, EXTENDED RING TOPOLOGIES, RING-STAR TOPOLOGIES, EXTENDED RING-STAR HYBRID TOPOLOGIES, ETC.

SYSTEM, METHOD AND ASSOCIATED COMPUTER READABLE MEDIA FOR FACILITATING MACHINE LEARNING ENGINE SELECTION IN A NETWORK ENVIRONMENT

PRIORITY AND CROSS-REFERENCE TO RELATED APPLICATION(S)

This patent application claims priority based upon the following prior United States provisional patent application(s): (i) "SYSTEM, METHOD AND ASSOCIATED COMPUTER READABLE MEDIA FOR FACILITATING MACHINE LEARNING MODEL SELECTION IN A NETWORK ENVIRONMENT," Application No.: 62/925,469, filed Oct. 24, 2019, in the name(s) of Yekta Turk et al.; each of which is hereby incorporated by reference in its entirety.

TECHNICAL FIELD

The present disclosure generally relates to communication networks. More particularly, and not by way of any limitation, the present disclosure is directed to a system, method, apparatus and associated computer readable media for facilitating machine learning (ML) engine selection in a network environment.

BACKGROUND

Data and communication networks are rapidly evolving while the industry is struggling to keep up with the rising demand of connectivity, data rates, capacity, and bandwidth. For example, Next Generation mobile networks (e.g., 5th generation or 5G) are particularly faced with the challenge of providing a quantum-change in capability due to the explosion of mobile device usage and expansion to new use-cases not traditionally associated with cellular networks, which is only further exacerbated given the ever-increasing capabilities of the end-user devices. The requirements for 5G are also manifold, as it is envisaged that it will cater for high-bandwidth high-definition streaming and conferencing, to machine interconnectivity and data collection for the Internet-of-Things (IoT), and to ultra-low latency applications such as autonomous vehicles as well as augmented reality (AR), virtual reality (VR) or mixed reality (MR) applications, and the like.

In another example setting, organizational complexity of large scale data centers has also evolved rapidly as the commercial opportunities they provide has expanded exponentially. Typical modern data centers may be organized as collections of clusters of hardware that run an array of standard software packages, such as web servers, database servers, etc., which may be interconnected by high speed networking, routers, and firewalls. Human operators typically organize these machines, optimize their configuration, debug errors in their configuration, and install and uninstall software on the constituent machines.

In network management, rapid recognition of failures in the network and fast identification of root cause(s) of the failure are crucial to the reliability of the network. In view of the volume, scale, and velocity of data gathered with respect to the management of current network implementations, all of which will inevitably grow in the future regardless of where they are deployed, there is a resurgence of interest in techniques such as machine learning (ML), especially in the context of predictive modeling related to network performance and fault analysis. Although advances in ML techniques continue to take place, there is a still a tendency for ML-based approaches to be less than optimal when applied in the field of network fault analysis and diagnostics, thereby requiring further innovation as will be set forth hereinbelow.

SUMMARY

The present patent disclosure is directed to systems, methods, apparatuses, devices, and associated non-transitory computer-readable media for effectuating ML-based fault analysis and diagnostics in a network comprising a plurality of nodes. In one aspect, an example method comprises, inter alia, determining that at least one of a topological configuration of the network and one or more key performance indicator (KPI) requirements associated with the network infrastructure and/or services have changed. Responsive to the determining, a topology-dependent machine language (ML) engine is selected that may be optimally adapted to facilitate root cause determination of any faults detected in the network after the topological configuration or any KPI requirements of the network have changed. In one embodiment, a rule-based selector may be provided that is operative to identify, select or otherwise obtain a particular ML engine from a pool of preconfigured or predetermined ML engines that respectively correspond to different types of network topological configurations and KPI requirements of the network, wherein the particular ML engine is adapted to the corresponding topological configuration change and/or the KPI requirements detected in the network. In another embodiment, a built-in ML-based selector may be provided for selecting an ML engine, which may be dynamically predicted and trained based on the corresponding the topological configuration change or the KPI requirements detected in the network.

In another aspect, a system configured to effectuate ML-based fault analysis in a network comprising a plurality of nodes is disclosed. The claimed embodiment comprises, inter alia, a data collector configured to collect topological configuration data and KPI data associated with the network; a topology and performance manager (TPM) module coupled to the data collector, the TPM module configured to determine that at least one of a topological configuration of the network and one or more KPI requirements associated with the network's services may have changed by a corresponding threshold; an ML engine selector coupled to the TPM module, the ML engine selector operative to select an ML engine based on an input from the TPM module generated responsive to determining that the topological configuration of the network, one or to more KPI requirements, or both in any combination, has(have) changed by the corresponding threshold; and a fault analytics and diagnostics module operative to perform root cause determination of a fault based on a selected ML engine provided by the ML engine selector, wherein the selected ML engine may be optimally adapted to facilitate root cause determination of any faults detected in the network after the topological configuration or any KPI requirements of the network have changed. In one embodiment, the ML engine selector may be configured as part of a Network Operations Center (NOC), an Operations Support System (OSS), a Business Support System (BSS), a Management and Orchestration (MANO) system and a Kubernetes orchestration system associated with the network, and the like, for example. In one embodiment, the ML engine selector may be configured as a rule-based selector for selecting a particular ML engine from a plurality of predetermined/preconfigured ML engines that respectively correspond to different types and combinations of network topological configurations and KPI requirements of the network. In another embodiment, the ML engine selector may be configured as a built-in ML-based module for dynamically predicting and training an ML engine corresponding to the topological configuration change and/or the KPI requirements detected in the network. In one arrangement, the data collector may be configured to collect the data from Software-Defined Network (SDN) infrastructures and/or non-SDN network infrastructures, using, for example, Simple Network Management Protocol (SNMP), Network Configuration (NetConf) protocol, Transaction Language 1 (TL1) protocol, OpenFlow protocol, and the like.

In still further aspects, one or more network nodes, elements or apparatuses are disclosed, each comprising at least one processor and persistent memory having program instructions stored thereon, wherein the program instructions are configured to perform an embodiment of the methods set forth herein when executed by the respective at least one processor. Further features of the various embodiments are as claimed in the dependent claims.

Embodiments of the present disclosure advantageously provide an adaptive ML-based fault analysis and diagnostics system operative in myriad network configurations, wherein topology-dependent and topology-specific ML engines may be used for facilitating root cause determination of network failures in an efficient manner, especially in network environments that may involve hundreds or even thousands of nodes disposed in dynamically changing topologies. Embodiments of an example system can work both in traditional and SDN-based network infrastructures that may be deployed in various types of networking environments, including container or virtual network function (VNF)-based systems in some arrangements. Because network changes in container/VNF-based systems can be significant at physical and virtual topology level, embodiments are particularly advantageous due to the better predictive modeling of the fault analysis schemes that may be employed in such varying network configurations.

These and other advantages will be readily apparent to one of skill in the art in light of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 2A-2F are flowcharts of various blocks, steps and/or acts that may be (re)combined in one or more arrangements, with or without additional flowcharts of the present disclosure, according to one or more embodiments for facilitating ML engine/model selection;

DETAILED DESCRIPTION

Figure 1A:
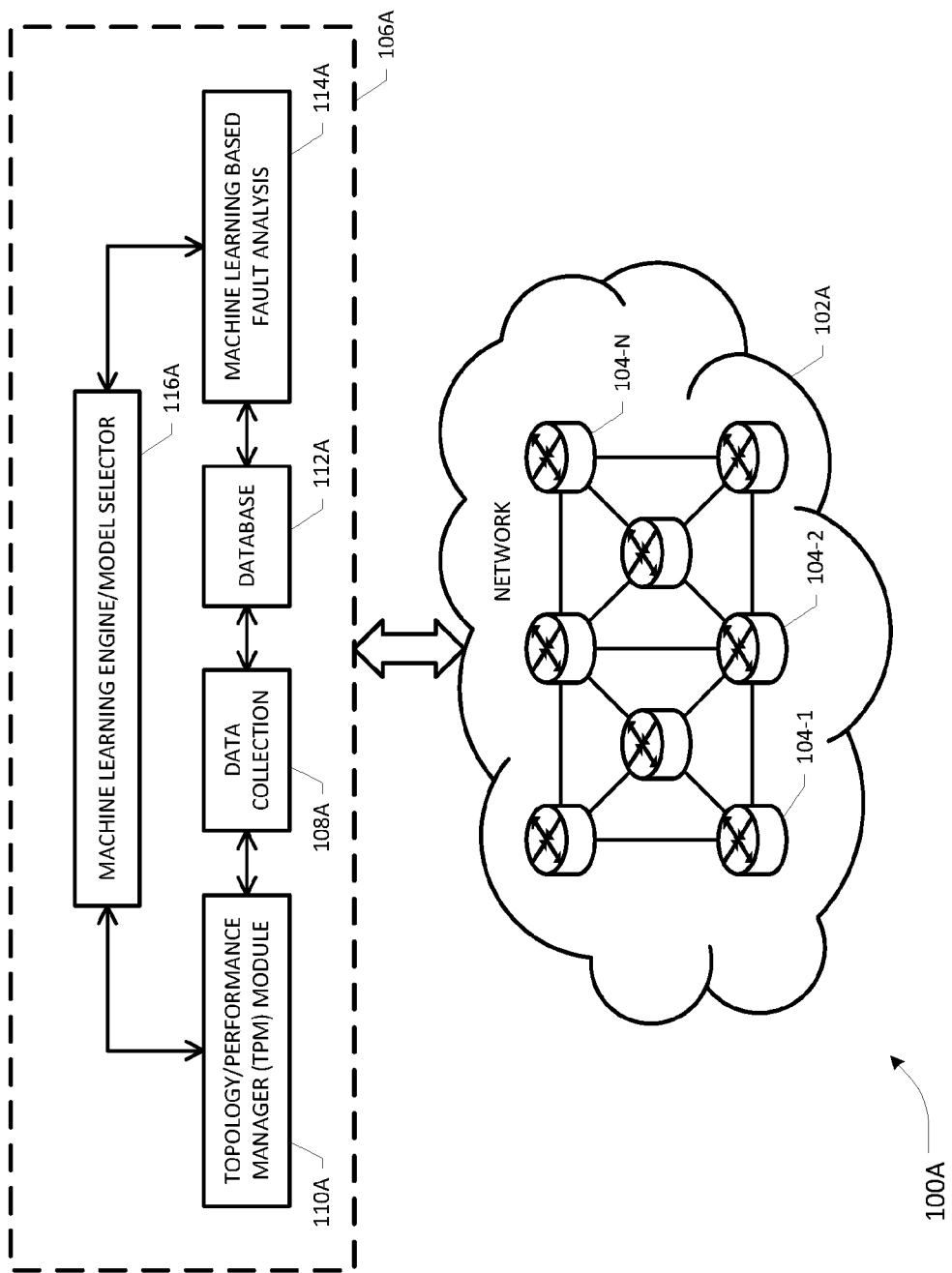
FIGS. 1A and 1B depict example network architectures wherein one or more embodiments of the present patent disclosure may be practiced for purposes of effectuating machine language (ML) based fault management in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate, mutatis mutandis. Likewise, any advantage of any of the embodiments may apply to any other embodiments, and vice versa. Other objectives, features and advantages of the enclosed embodiments will be apparent from the following description.

As used herein, a network element or node may be comprised of one or more pieces of service network equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, video, and multimedia). In some embodiments, network elements or nodes may be adapted to host one or more applications or services with respect to a plurality of subscriber end stations or client devices. Accordingly, for purposes of some of the embodiments, a network element may be deployed in enterprise networks, intranets, extranets, data center networks, service provider networks, web-based content provider/distribution networks, cloud platforms, telecom networks (e.g., wireline and/or wireless/mobile networks, satellite communications networks, etc.), the Internet of Things (IoT) or Internet of Everything (IoE) networks, and the like. In general, such networks may be organized in any known or heretofore unknown configurations and topologies, wherein a machine language (ML)-based fault management system and method may be implemented according to the teachings herein.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment in some embodiments. Accordingly, example UE devices may comprise various classes of devices, e.g., multi-mode UE terminals including terminals adapted to communicate using various communications infrastructure(s), e.g., terrestrial cellular communications infrastructure(s), Non-Terrestrial Network (NTN) infrastructure(s), or WiFi communications infrastructure(s), or any combination thereof, as well as smartphones, multimedia/video phones, mobile/wireless user equipment, Internet appliances, smart wearables such as smart watches, portable laptops, netbooks, palm tops, tablets, phablets, mobile phones, IoT devices and sensors, connected vehicles (manual and/or autonomous), and the like, as well as networked or local gaming devices/consoles including augmented reality (AR), virtual reality (VR) or mixed reality (MR) devices, and the like, each having at least some level of network communication functionalities for accessing suitable infrastructures that may be managed by ML-based fault analysis systems according to some example implementations.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a network element, a cloud-based data center node, a network management node, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present patent disclosure.

Figure 1B:
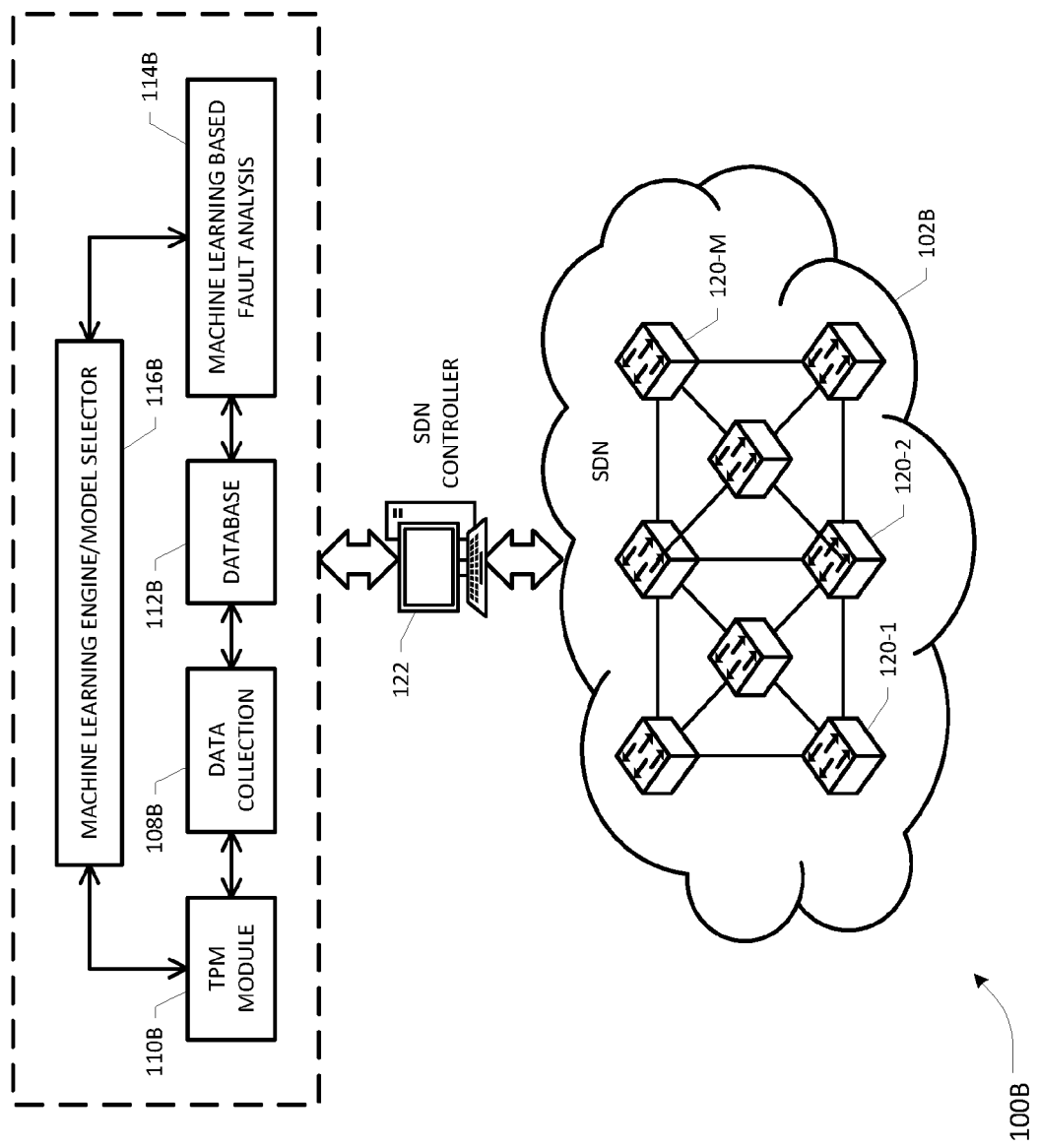

Referring to the drawings and more particularly to FIGS. 1A and 1B, depicted therein are example network architectures wherein one or more embodiments of the present patent disclosure may be practiced for purposes of effectuating machine language (ML) based fault analysis and diagnostics (FAD) in accordance with the teachings herein. A system level architecture 100A shown in FIG. 1A may comprise a traditional network environment 102A involving a plurality of network elements 104-1 to 104-N disposed in a configurable topological arrangement wherein the control and data-forwarding planes may be coupled in some fashion, e.g., loosely coupled or tightly coupled, in the architecture of the elements. A management system 106A coupled to or otherwise associated with the network 102A comprises a data collector component 108A, a topology and performance manager/monitor component 110A, one or more databases 112A, and an ML-based FAD management component 114A. Although network performance monitoring is shown as associated with a topology configuration manager in FIG. 1A, such functionality may be provided as part of or otherwise associated with one or more other components of the management system 106A for monitoring, obtaining, or otherwise determining various types and levels of performance metrics, which may be designated as Key Performance Indicators (KPIs), that may be used as an input along with network topology configuration changes to an ML engine selection process according to some embodiments. In one arrangement, an ML engine selector module or component 116A may also be provided as part of the management system 106A that may be configured to select, generate, obtain or otherwise cause to be engendered a particular ML engine for facilitating fault analysis, wherein the particular ML engine may be dynamically changed and optimized based on detecting changes in the topological configuration and/or performance requirements of the network as will be set forth in detail further below. In some arrangements, one or more of the foregoing components may be associated with and/or provided as part of an overall network operations support management architecture involving components such as, e.g., a Network Operations Center (NOC), Operations Support System (OSS), Business Support System (BSS), a combined OSS/BSS, or a Management And Network Orchestration (MANO), etc.

In some embodiments, a network infrastructure may be based on technologies such as Software Defined Networking (SDN), FIG. 19 illustrates an example system level architecture 100B including an SDN-based network environment 102B, which typically involves separation and decoupling of the control and data forwarding planes of the network elements, whereby network intelligence and state control may be logically centralized and the underlying network infrastructure is abstracted from the applications. One implementation of an SDN-based network architecture may therefore comprise a network-wide control platform, executing on or more servers, which is configured to oversee and control a plurality of data forwarding nodes or switches 120-M. Accordingly, a standardized interfacing may be provided between the network-wide control platform (which may be referred to as SDN controller 122) and nodes 120-M, thereby facilitating high scalability, flow-based traffic control, multi-tenancy and secure infrastructure sharing, virtual overlay networking, efficient load balancing, and the like. Similar to the arrangement of FIG. 1A, a management system 106B may be provided that is operatively coupled to or otherwise associated with the SDN-based network 102B for facilitating an ML-based FAD management scheme. In some embodiments, system 106B may therefore be configured to include a data collector component 108B, a topology and performance manager/monitor component 110B, one or more databases 112B, and an ML-based fault analysis and diagnostics component 114B. Although a network performance monitor is shown in FIG. 1B as associated with a topology configuration manager analogous to the arrangement shown in FIG. 1A, such functionality may also be provided as part of or otherwise associated with one or more other components of system 106B, e.g., database analytics and fault analysis, for monitoring KPI data associated with the network 106B. Further, an ML engine selector module or component 116B may also be provided as part of the management system 106B similar to the arrangement of FIG. 1A, which may be configured to select or generate a particular ML engine for facilitating fault analysis with respect to the underlying network 106B, wherein the particular ML engine may be dynamically changed and optimized based on control inputs responsive to detecting changes in the topological configuration and/or performance requirements of the network 106B. Sill further, one or more components of system 106B may be coupled to and/or provided as part of a NOC, OSS/BSS or MANO platform associated with the network 102B.

It will be apparent that regardless of the underlying network architecture, systems 106A and 106B may be configured to operate in a similar manner with respect to aspects such as data collection, KPI monitoring, topology mapping and configuration, etc., for purposes of effectuating an ML-based fault management scheme according to the teachings herein. Accordingly, various embodiments will be described in an agnostic manner without necessarily specifying the underlying network architecture unless otherwise indicated. Moreover, where certain steps, structures, blocks, acts or functions are described relative to an ML engine selection scheme for effectuating fault analysis and management within the context of a specific network architecture, skilled artisans will recognize that such steps, structures, blocks, acts or functions may be implemented in the context of other network architectures as well, mutatis mutandis, according to some embodiments of the present disclosure.

As noted previously, one or more components of systems 106A/106B may be integrated within an OSS/BSS platform while other components may be configured as external modules separately disposed from the OSS/BSS. Further, the structure and function of any component set forth above with respect to systems 106A/106B may be combined, integrated or distributed in conjunction with one or more other components. In general operation, systems 106A/106B may be configured to collect KPI data from the underlying network 102A/102B through data collector 108A/108B using appropriate protocols, interfaces, etc., which may be either standard and/or proprietary. In a traditional network arrangement of FIG. 1A, network management protocols such as, e.g., Simple Network Management Protocol (SNMP), Network Configuration (NetConf) protocol, Transaction Language 1 (TL1) protocol, etc. may be used for collecting data from various nodes, elements, switches, and the like. In an SDN-based network arrangement of FIG. 1B, protocols such as OpenFlow (OF) protocol, Forwarding and Control Element Separation (ForCES) protocol, OpenDaylight protocol, SNMP, etc., may be used in association with SDN controller 122 for data collection. Further, appropriate topology mappers and managers of system 106A/106B may be configured to detect, map or otherwise determine any changes in the underlying network topology, which may be comprised of either physical, virtual/logical, or hybrid configuration, as the nodes are added, deleted, or reconfigured in an example network environment (e.g., data centers, telecommunications networks, wide area networks, etc.).

Figure 2A:
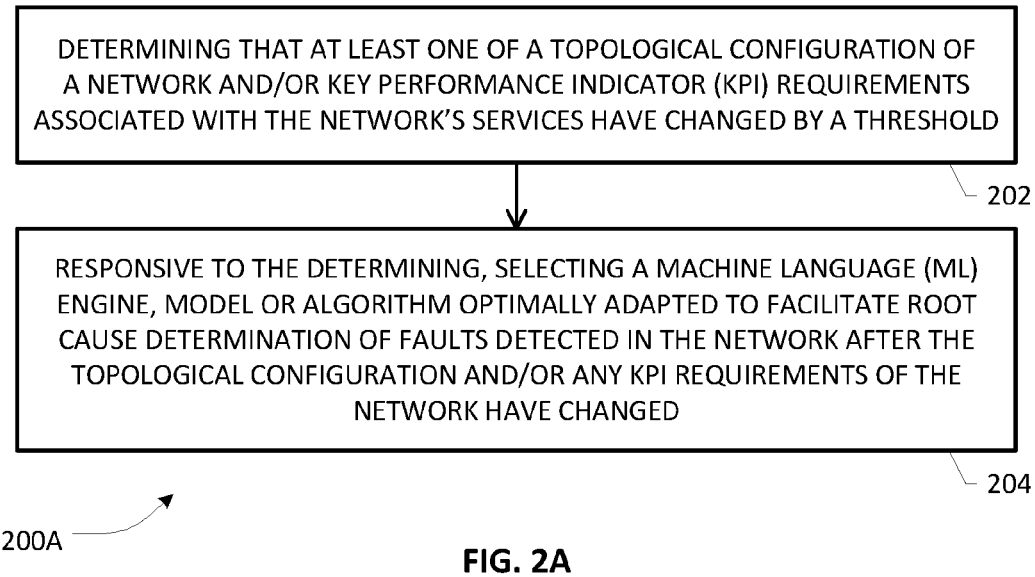
Figure 2B:
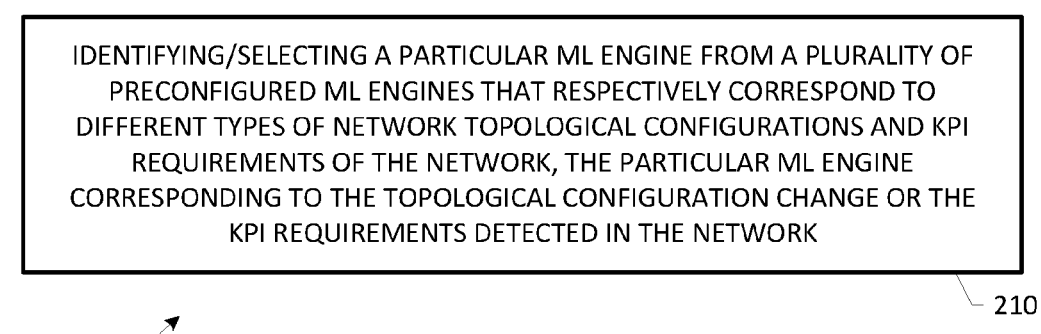
Figure 2C:
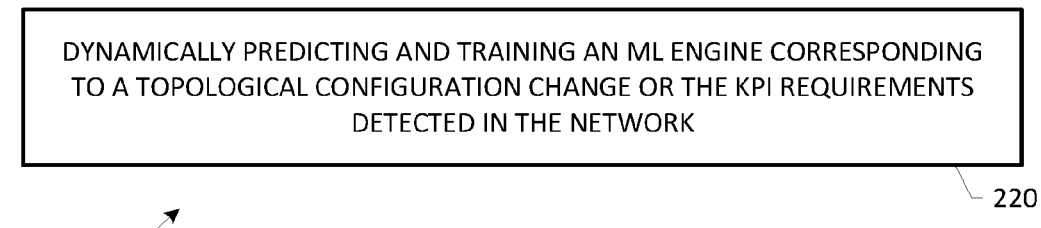

FIGS. 2A-2F depict flowcharts comprising various blocks, steps and/or acts that may be (re)combined in one or more arrangements, with or without additional flowcharts of the present disclosure, according to one or more embodiments for facilitating ML engine selection that may be implemented in an ML-based network FAD management system exemplified in FIGS. 1A and 1B set forth above. Process flow 200A of FIG. 2A represents an overall selection process which involves determining that at least one of a topological configuration of a network and/or one or more KPIs or performance requirements associated with the network (e.g., infrastructure and/or services supported by the network) have changed by a corresponding threshold level or degree (block 202). In some embodiments, there may be different types and levels of thresholds that may be preconfigured or dynamically determined with respect to topological changes, KPIs, and other parameters associated with the network (e.g., hardware/infrastructure changes, services, link level logical/physical topology, etc.). Responsive to determining that the network's topology and/or one or more KPI requirements have changed by a corresponding threshold level, a particular new ML engine, model or algorithm is selected or generated that is optimally adapted to facilitate root cause determination with respect to any faults detected in the network after the changes in the topology and/or KPI requirements have taken place, as set forth at block 204. In some embodiments, a selected ML engine may undergo a training phase based on at least a portion of test data obtained from the network, which may be real time or near real time, before the selected ML engine is deployed in conjunction with a FAD management module of the network.

In some arrangements, determinations with respect to topological changes and/or KPI requirement changes may be made online or offline, based on data collected from the network in near real time, quasi real time, or in some combination thereof, although it may be preferred that an ML engine selection process is not triggered too frequently such that it causes a heavy administrative and computational overload in the management system. It should be appreciated that when ML-based intelligence is used for analyzing the faults and identifying the root causes of the faults, different topologies require different analysis methods to properly and correctly identify the underlying root cause. For example, root causes of an interrupted traffic flow in a star topology can be vastly different compared to those applicable to other topologies such as a ring topology or double-ring topology, etc. Embodiments herein therefore advantageously account for such topological changes that may take place dynamically in an example network by selecting a particular ML engine optimally adapted to facilitate root cause determination in an efficient manner.

In some embodiments, selecting a particular ML engine may involve providing a pool of preconfigured ML engines that may correspond to different types of network configurations, KPI requirements, etc., which may be queried based on and responsive to when a network topology configuration and/or KPIs have changed by a respective threshold. Such preconfigured ML engines may be developed, trained, and deployed for selection based on suitable guidance from domain knowledge experts, which may comprise human experts and/or artificial intelligence (AI)-based expert systems. As set forth at block 210 of process flow 200B shown in FIG. 2B, a rule-based selection process may be employed for identifying and selecting a particular ML engine that corresponds to a new topology and/or new KPI requirements detected in the network. In some embodiments, there may be multiple rules provided for facilitating a more nuanced selection scheme wherein the rules may be prioritized depending on the network deployment conditions as will be set forth in detail further below. In still further embodiments, selecting a particular ML engine may involve predicting an initial ML engine dynamically (e.g., on the fly) in response to determining or otherwise detecting minimum threshold level change(s) in the network topology and/or KPI requirements and potentially training the initial ML engine using test data obtained in real time or near real time to obtain a converged ML engine suitable for deployment in conjunction with a fault analytics module. These processes are exemplified at block 220 of process flow 200C shown in FIG. 2C.

Figure 2D:
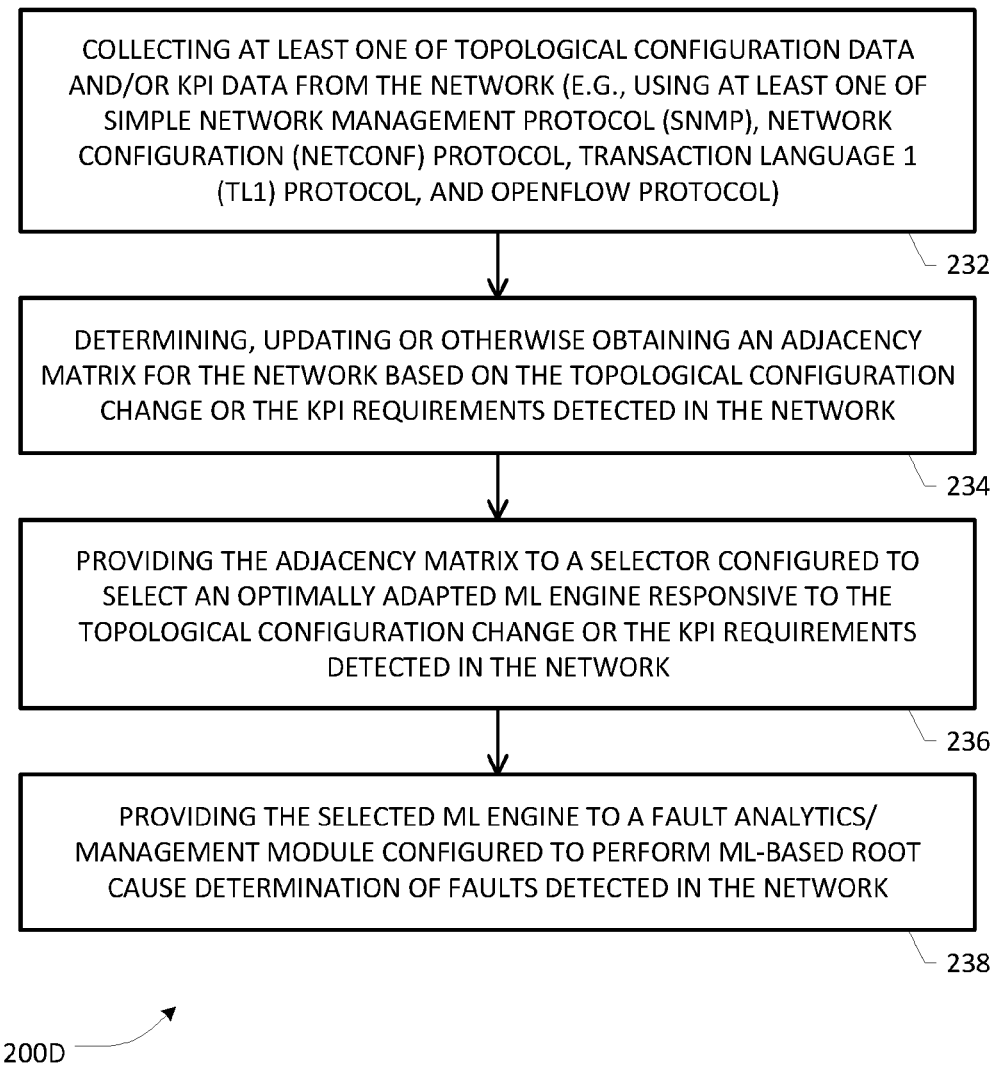

Process flow 200D shown in FIG. 2D exemplifies further details with respect to some of the process flows set forth above. At block 232, at least one of topological configuration data and/or KPI data from the network having a plurality of nodes may be collected using a variety of known or heretofore unknown mechanisms, protocols, interfaces, etc., including but not limited to at least one of SNMP, NetConf, TL1, OpenFlow, and the like, depending on the underlying network architectural implementation, as noted previously. At block 234, an adjacency matrix and/or associated topology mapping table for the network may be determined, updated, or otherwise obtained based on the topological configuration change or the KPI requirements detected in the network. In some embodiments, the adjacency matrix and related topology information may be provided as at least one control input to a selector configured to select an optimally adapted ML engine responsive to the topological configuration change or the KPI requirements detected in the network (block 236). Subsequently, the selected ML engine may be provided to a FAD management module configured to perform ML-based root cause determination of faults detected in the network (block 238). With respect to obtaining network topology adjacencies, some example embodiments may involve categorizing the plurality of nodes into different classes or types of nodes, e.g., edge/border nodes (i.e., ingress or egress nodes), intermediary/intermediate nodes and core nodes based on the nodes' location in the network configuration and/or their performance capability, as set forth at block 240 of process flow 200E shown in FIG. 2E. Such classifications of nodes may be vary depending on the network topologies, wherein data from different classes of nodes may be used for training ML engines appropriately. As set forth at block 250 of process flow 200F shown in FIG. 2F, network topological configurations may be classified or categorized into a plurality of classes comprising, e.g., star topologies, extended star topologies, tree topologies, mesh topologies, bus topologies, ring topologies, double ring topologies, extended ring topologies, ring-star hybrid topologies, extended ring-star hybrid topologies, etc.

Figure 3A:
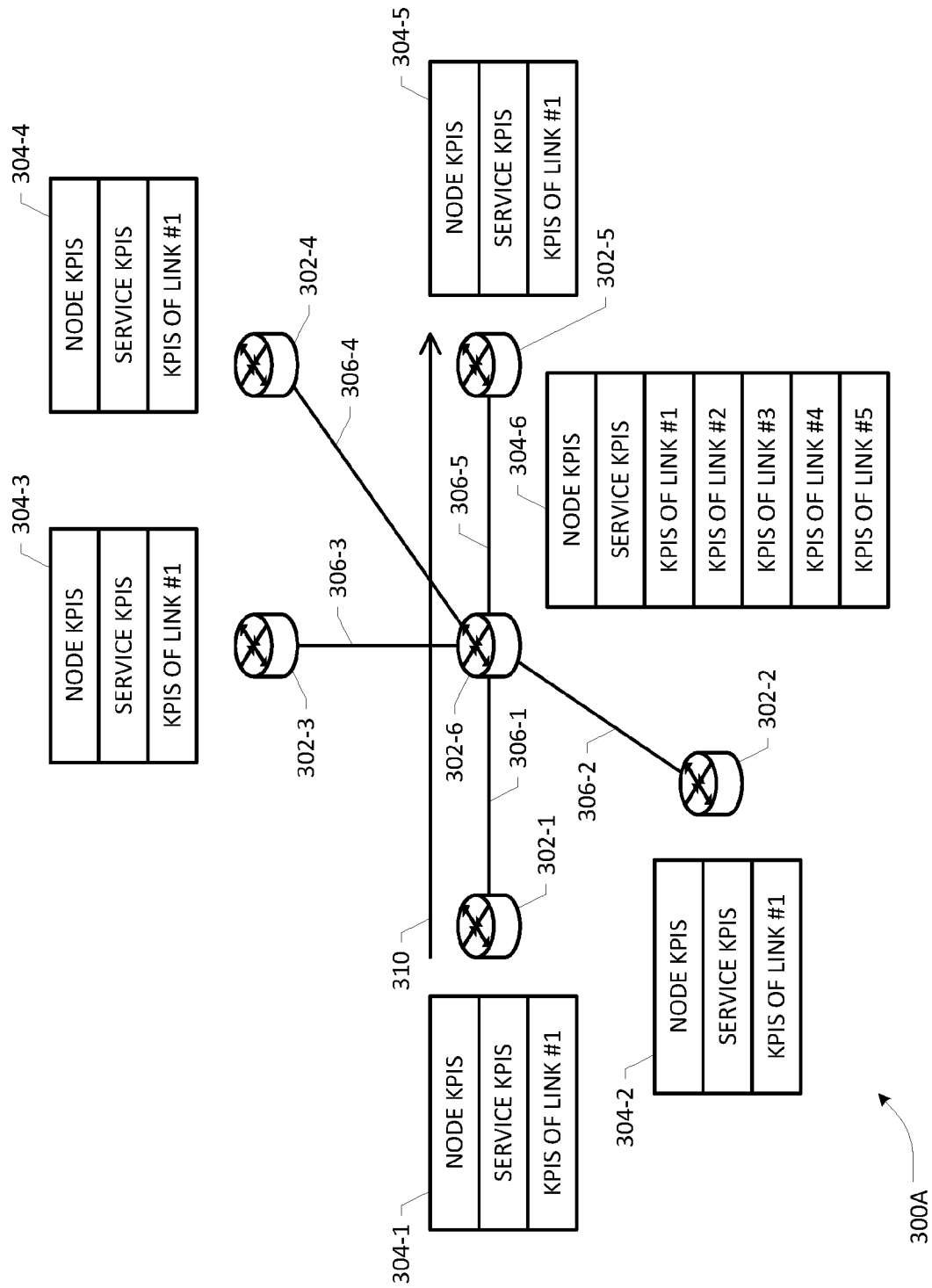
FIG. 3A depicts an example star network topology having a plurality of nodes wherein performance data may be collected for facilitating ML engine selection according to an embodiment of the present invention.

It should be appreciated that depending on and because of the different network configuration and ML engine selection approaches described above, different types and granular levels of datasets may be collected from a network. FIG. 3A depicts an example star network topology 300A having a plurality of nodes or elements wherein different performance data may be collected that may be used for facilitating ML engine selection according to an embodiment of the present invention. Without limitation, six nodes 302-1 to 302-6 are illustrated in star topology 300A, comprising a center node 302-6 connected to five edge nodes 302-1 to 302-5 via links 306-1 to 306-5, for facilitating a network traffic flow path 310 from node 302-1 to 302-5 via center node 302-6. Example KPI datasets may be collected from individual nodes, links as well as service level KPIs configured in the network. As illustrated, KPI datasets 304-1 to 304-6 are representative of datasets collected with respect to corresponding nodes 302-1 to 302-6. As each edge node is connected via a single link to the center node 302-6, KPIs associated with that link and any service level KPIs as well as node hardware KPIs (e.g., CPU resources, memory resources, ports, network interface cards, etc.) may be collected with respect to that edge node. On the other hand, example dataset 304-6 collected from center node 306-6 may include KPIs of five links 306-1 to 306-5 due to its connectivity to five edge nodes. Example datasets may comprise service KPIs that may contain, inter alia, configuration information relative to each node indicating the node's involvement in features such as, e.g., a virtual LAN (VLAN) service, a virtual extensible LAN (VXLAN) service, a Multiprotocol Label Switching (MPLS) service, a virtual private routed network (VPRN) service, a virtual private LAN service (VPLS), a Virtual Router Redundancy Protocol (VRRP) redundancy service, and a tunneling service, etc. In such arrangements, not only the changes related to the physical topology but also any changes in the virtual topologies that overlay the physical topology as well as the overall configuration changes may be taken into consideration for triggering an ML engine selection process according to some embodiments. Further, because a fault analysis system operative to find root causes of any faults associated with the traffic flow paths in the network requires data corresponding to each link and node potentially available to effectuate the traffic flow paths, an ML engine needs the awareness of each link or node in the network. Accordingly, as the topology changes (both in physical and/or virtual/logical configurations), the datasets including the service KPIs may need to be updated as well, which may initiate an ML engine selection process in accordance with the teachings herein.

Figure 3B:
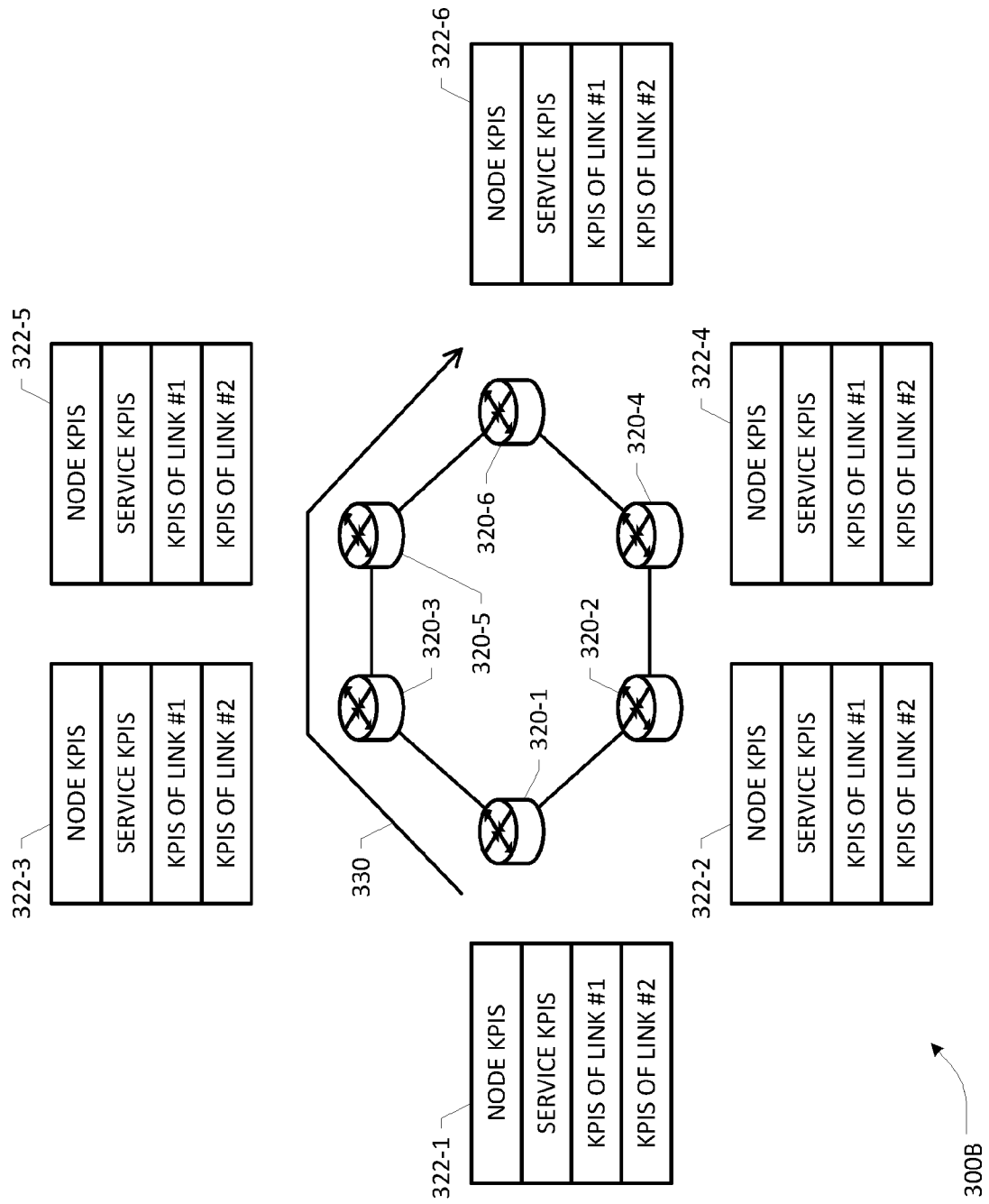
FIG. 3B depicts an example ring network topology having a plurality of nodes wherein performance data may be collected for facilitating ML engine selection according to an embodiment of the present invention.

FIG. 3B depicts an example ring network topology 300B having a plurality of nodes or elements wherein different performance data may be collected that may be used for facilitating ML engine selection according to an embodiment of the present invention. By way of illustration, six nodes 320-1 to 320-6 are exemplified in ring topology 300B for facilitating a network traffic flow path 330 from node 320-1 to 320-6. Similar to the star topology arrangement 300A described above, example KPI datasets comprising node KPIs, link KPIs, service KPIs, etc. may be collected from individual nodes, links as well as other elements and/or end user equipment serviced thereby, where included in an example fault analysis scenario. Datasets 322-1 to 322-6 are representative of data collected from corresponding nodes 320-1 to 320-6. Because each network node has connectivity with two other nodes in the ring topology configuration, each dataset includes KPIs associated with two links connecting the node to its two adjacent nodes.

Figure 4A:
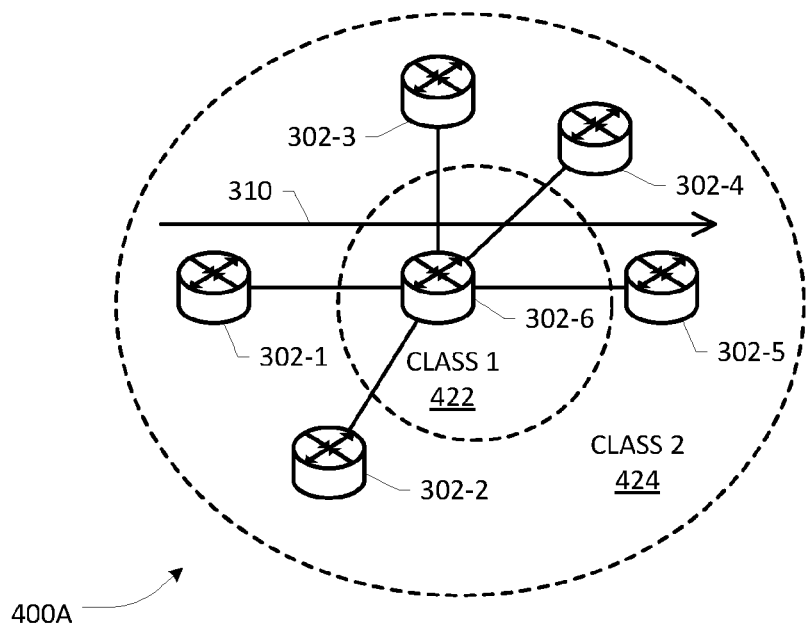
FIG. 4A depicts an example star network topology wherein a plurality of nodes may be classified into different classes or categories for purposes of an embodiment of the present invention.
Figure 4B:
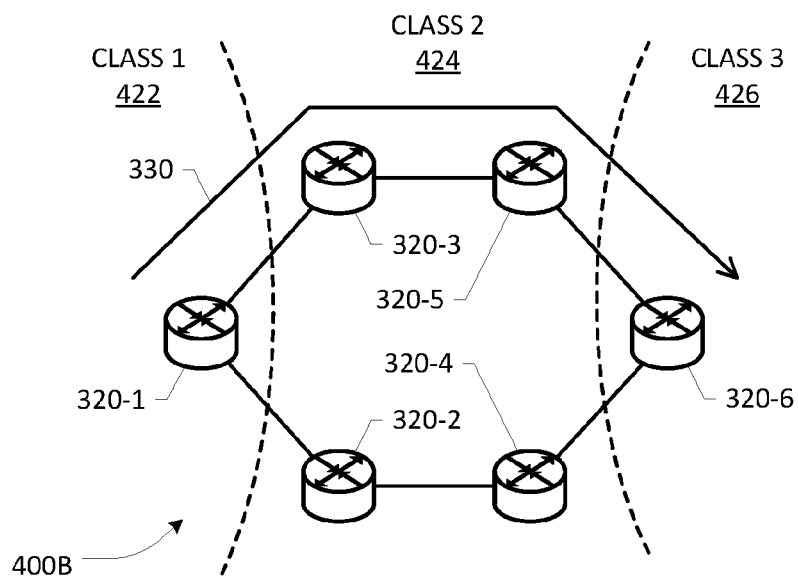
FIG. 4B depicts an example ring network topology wherein a plurality of nodes may be classified into different classes or categories for purposes of an embodiment of the present invention.

Depending on the topological configuration, nodes of a network may be categorized into different classes, which may be used in employing different training methodologies that may vary depending on the configuration, architecture and/or ML implementation. In some embodiments, an example ML algorithm, model or engine selected according to the teachings herein may be trained by creating different scenarios, e.g., on each node one by one or in combinations or sub-combinations of nodes. Whereas an end node drives traffic passing through itself, its traffic behavior may not be similar to that of a center node because the center node's behavior affects the entire topology. Therefore, at least from the traffic behavior standpoint, center nodes and edge/end nodes may be categorized into separate classes. By way of illustration, FIG. 4A depicts an example classification scheme 400A relative to a star network topology, e.g., star topology 300A described above, wherein the plurality of nodes or elements may be classified into different classes or categories for purposes of an embodiment of the present invention. As shown, center node 302-6 is categorized in a class (Class 1) 402, whereas edge nodes 302-1 to 302-5 are categorized as a separate class (Class 2) 404, which may be used as two training classes. On the other hand, FIG. 4B depicts an example classification scheme 400B relative to a ring network topology, e.g., ring topology 300B set forth above, wherein a plurality of nodes or elements may be classified into three different classes or categories for purposes of an embodiment of the present invention. As shown, a Class 1 category 420 comprises node 320-1, a Class 2 category 424 comprises intermediary nodes 320-2 to 320-5, and a Class 3 category 426 comprises node 320-6.

Skilled artisans will recognize that although an identical problem or fault condition may be encountered in a network, e.g., with respect to a traffic flow path, different root causes are possible for different topologies. As can be seen in FIGS. 3B and 4B, there is a path redundancy with respect to traffic flow path 330 in the ring topology 300B, which can change the datasets collected and the ML engine used for fault analysis therein. On the other hand, there is no path redundancy with respect to traffic flow path 310 in the example star topology 300A, thereby necessitating a different approach regarding dataset collection and ML engine selection for facilitating fault analysis according to the teachings herein. Consistent with the teachings set forth above with respect to at least a portion of FIGS. 2A-2F, some example embodiments herein may therefore relate to a scheme, system or method wherein the topology information and KPI changes may be generated to and received by a topology manager, e.g. dynamically, periodically, or via event-based triggering mechanisms, or a combination thereof. As previously noted, example embodiments may be configured to determine whether there are any actionable changes by processing the received topology mapping information. After such determination, and responsive thereto, the ML selection system determines which ML engine should be applied for analyzing the network. In this way, as the topologies change, the selected ML engine or model used in performing root cause analysis may change, whereby a more accurate fault analysis may be performed in an efficient manner.

Figure 5A:
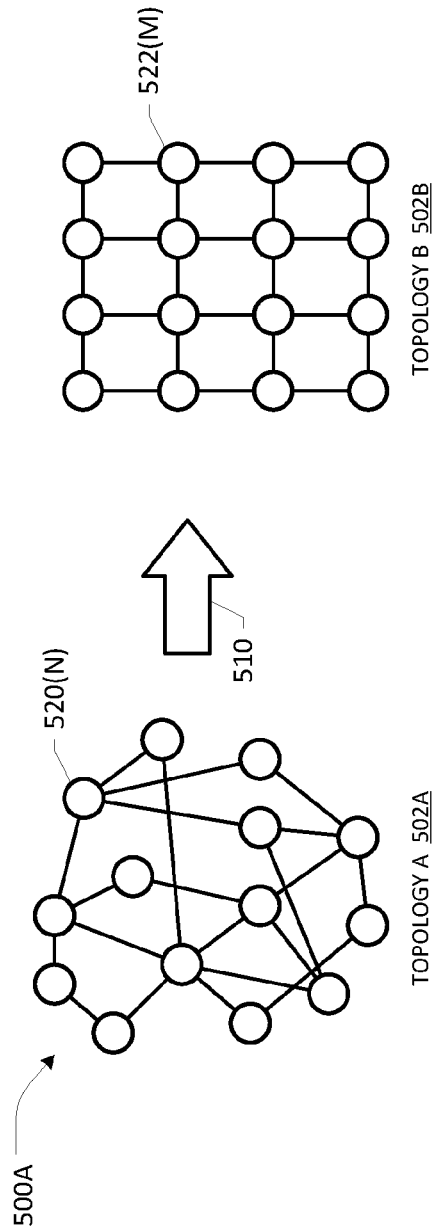
FIG. 5A illustrates a network graph transition from one example topological configuration to another example topological configuration that may require a different ML engine for fault management.

FIG. 5A illustrates a network graph transition 500A wherein a network topology changes from one example topological configuration to another example topological configuration that may require a different ML engine for fault management. As noted above, network nodes may be categorized as edge nodes, intermediate nodes, core nodes, etc., whose interconnectivity may be abstracted using certain constructs from graph theory. In some arrangements, a topology mapping or configuration scheme may be implemented wherein a predetermined objective function, e.g., a network traffic/performance metric, is minimized or otherwise optimized, which may result in topology changes. In some arrangements, topological changes may be caused due to deployment scenarios, network operator policy constraints, and the like. An example network, regardless of whether based on SDN infrastructure or otherwise, may be denoted as a graph G=(V, E) where a node set V represents the switches/nodes in the network and an edge set E represents the pair-wise links or edges among the switches depending upon the given connectivity or configuration of the network. In one implementation, graph G may be an undirected symmetric graph with weighted edges, i.e., if (u, v) 0 E, then (v, u) 0 E, where u and v are two nodes. In some constructs, each edge may be associated with a delay value $d_{u,v}$. The delay value can simply be $d_{u,v}=d_{v,u}=1$, meaning that the delay may be approximated as the hop count. Regardless of the graph construct is used, a topology graph 502A associated with an underlying network may be transitioned to another topology graph 502B due to an event 510. Such a topological transformation may result in a reduced number of nodes, increased number of nodes, addition/deletion of links, etc., which may be accompanied by changing of the network graph from $G_0=(V_0, E_0)$ to $G_1=(V_1, E_1)$. In some embodiments, a suitable "metric" or "distance" may be determined between the two graphs as $\|G_0 \sim G_1\|$, and if the metric is greater than a predetermined parameter, an ML engine selection mechanism may be triggered. In some embodiments, whereas the number of nodes may change, from nodes 520(N) to nodes 522(M) for instance, the underlying topology may not change by a sufficient degree so as to cause the triggering of an ML engine selection process. In still further embodiments, additional triggering factors involving various levels of KPI requirements, etc. may be utilized along with topological graph changes to obtain more sophisticated ML engine selection processes, as previously noted. For example, some embodiments may involve an ML engine selection process based on aggregate KPIs such as availability, latency, network utilization, jitter, dynamic trending, service level agreements (SLAs), data granularity, etc., in addition to the service KPIs noted above, which may be used in conjunction with topology change information. In still further embodiments configured to operate in association with a radio access network (RAN) infrastructure, changes in topology graph information may be used in conjunction with various types of granular data collected depending on the RAN infrastructure implementation, wherein some of the data may be reported by the UEs while the other data may be measured or monitored by the network elements. Example measurements in RAN environments may comprise, inter alia, intra-frequency measurements, inter-frequency measurements, inter-RAT measurements, traffic volume measurements, quality measurements, UE internal measurements, etc., wherein KPI variables at an aggregate level may comprise average number of active users, average cell throughput download, average cell throughput upload, cell availability, maximum cell throughput download, maximum cell throughput upload, and upload traffic volume (e.g., in GB), and the like.

In example embodiments, a topology manager may be provided with the information of regarding deployed nodes of a network, activated physical/virtual links, connection status of the nodes, etc., wherein such information may be stored, maintained or managed in a suitable data structure, e.g., a topology table. In some arrangements, link description fields in the configuration files of the nodes may contain the connection information in a format that is easy to parse. By the topology information, nodes can also be categorized as edge, border, egress/ingress, intermediate, and core nodes, etc., as noted above. In some embodiments, the category information can be detected by checking the connection types of the nodes. An example categorization can be interpreted as follows: an edge node is determined as a customer-facing node in which the customer service end points are configured. Intermediate nodes may have fewer customer connections and may have more aggregation of edge nodes' functionality. Core nodes are the backbone nodes that have no service end-point facing connections. In other example embodiments, categorization of nodes may be performed based on the capacity and capability of the nodes. Since equipment with lower capacity are located on the edge and capability increases towards the core nodes, capability-based categorization may therefore be provided as an another alternative and/or additional embodiment. Furthermore, the foregoing example categorizations can also be considered in some combination as yet another example categorization method that may be implemented for purposes of some embodiments of the present disclosure.

Figure 5B:
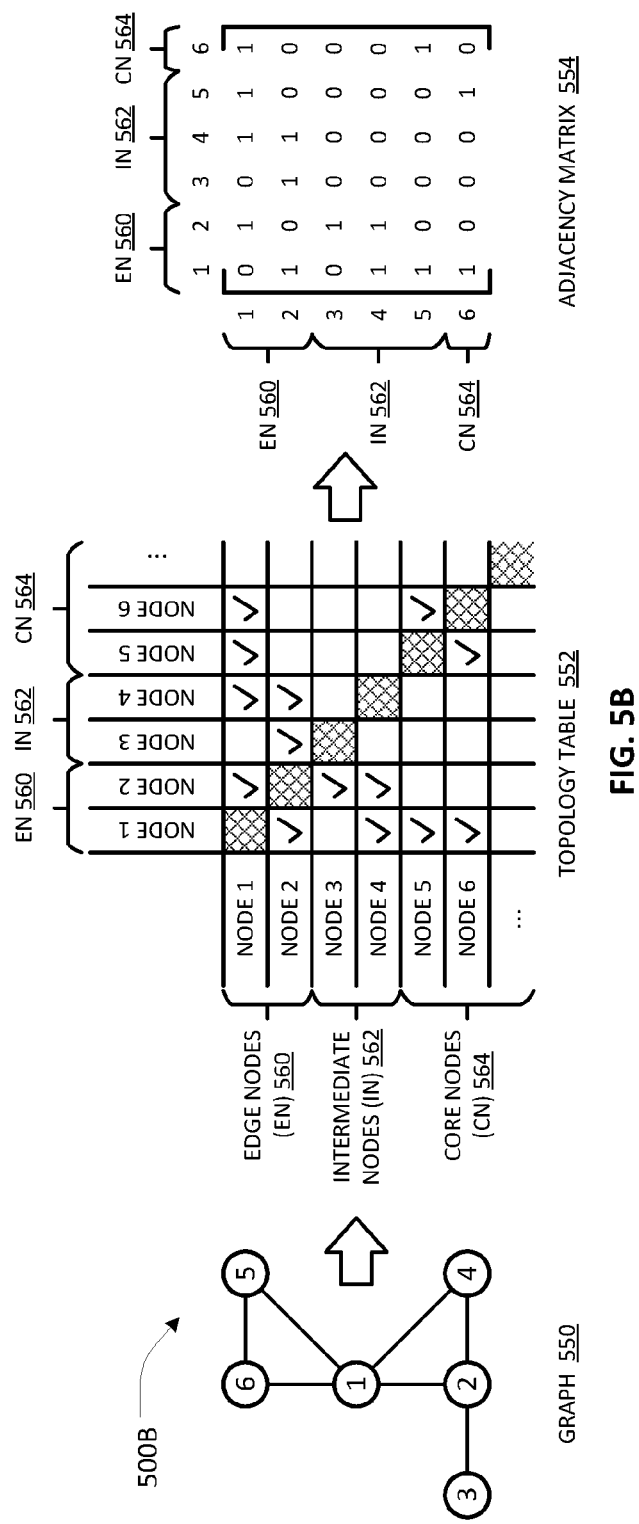
FIG. 5B depicts an example network and associated topology table for constructing an adjacency matrix that may be utilized in an embodiment of the present invention for facilitating ML engine selection.

FIG. 5B depicts an example scheme 500B for constructing an adjacency matrix associated with a network and corresponding topology table, which may be utilized in an embodiment of the present invention for facilitating ML engine selection. A network graph 550 having six nodes (Nodes 1 through 6) is exemplified for constructing a topology table 552. For purposes of illustration, Node 1 and Node 2 are designated as edge nodes 560, Node 3, Node 4 and Node 5 are designated as intermediate nodes 562, and Node 6 is designated as a core node 564. The topology table 552 comprises a symmetric table of N rows and N columns, corresponding to the N nodes in the network graph. Depending on the link connectivity of a node with other nodes, the topology table 552 includes an identifier (e.g., an X or a check mark) at a particular {row; column} location. For example, given that Node 1 has links to Node 2, Node 4, Node 5 and Node 6, corresponding column entries for the row Node 1 are shown with a check mark. Since each node has no self-looping link to itself, the corresponding row and column entry (i.e., the diagonal entry) in the table 552 is left empty. An adjacency matrix 554 corresponding to table 552 is therefore obtained as a symmetric square matrix of [N×N] dimension, with all elements being either 0 or 1 (i.e., a binary or logical matrix) and the main diagonal entries being all 0's by design.

Figure 5C:
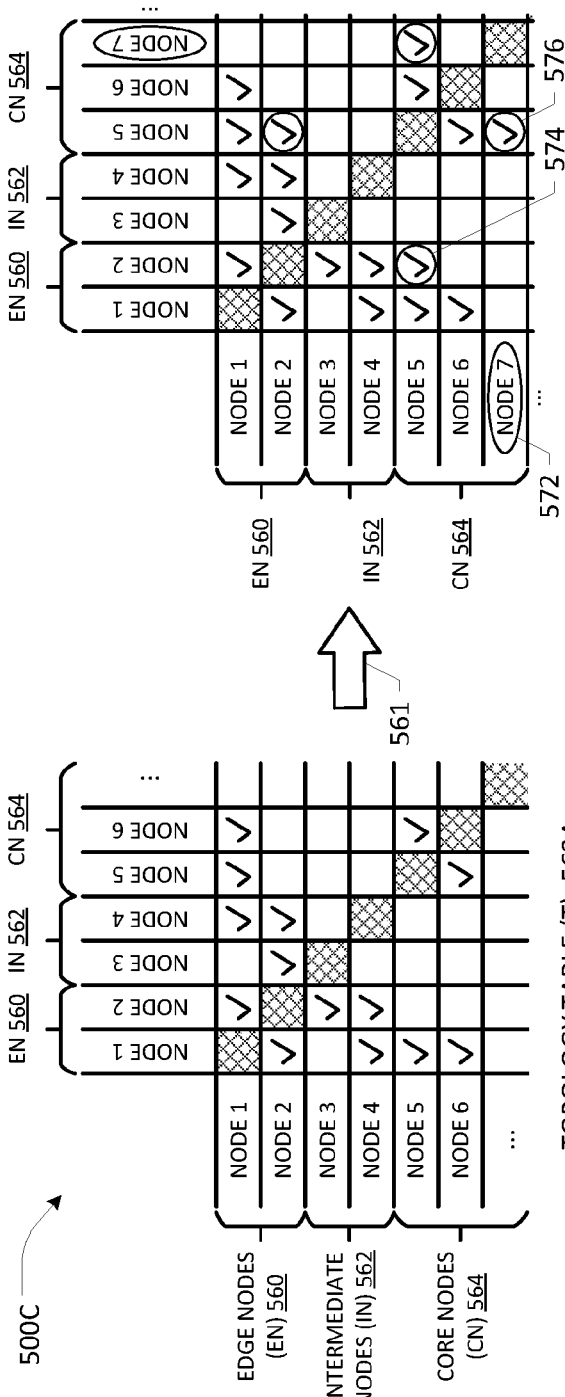
FIG. 5C depicts a scheme wherein the topology table of FIG. 5B is shown to change to a different topology table at a later time because of a change in the network topology.

FIG. 5C depicts a scheme 500C wherein the topology table of FIG. 5B is shown to change to a different topology table at a later time because of a transformation in the network topology. Topology table 562A is a representation of topology table 552 at time [T] corresponding to the network graph 550. At or after time [T+1], due to a transformation event 561, a new node (Node 7) is added to the network as another core node having link connectivity to Node 5. In addition, another link is added between Node 5 and Node 2. Topology table 562B therefore reflects a [7×7]

symmetric table, with Node 7, referred to by reference numeral 572, being added to the rows and columns, as well as two new links between Node 2 and Node 5 indicated appropriately. Such a topology change may be detected by a topology manager/mapper, which may be provided to an ML engine selector for selecting a new ML engine according to example embodiments herein.

Figure 5D:
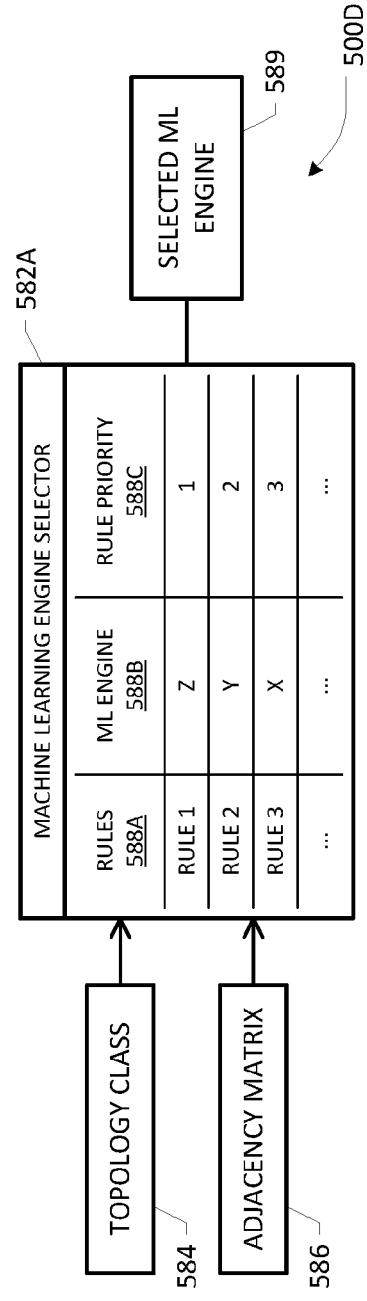
FIG. 5D depicts an example rule-based ML engine selector scheme according to one embodiment of the present invention.

FIG. 5D depicts an example rule-based ML engine selector system 500D according to an embodiment of the present invention. In one implementation of a rule-based selection scheme, it is assumed that ML engines, algorithms, processes, and/or models relative of FAD management in different types of network topologies have already been studied and the knowledge as to which ML engines, algorithms, processes, and models are suitable for which topology is already known. For example, different types of ML engines may be identified or otherwise designated for different topologies such as star topologies, extended star topologies, ring topologies, extended ring topologies, ring-star topologies, mesh topologies, hybrid topologies, etc., as noted. Depending on domain expertise that can be brought to bear in a network implementation, various hierarchical levels and/or multi-planar topologies may also be included in a rule-based selector scheme having appropriate ML engines. Further, more than one ML engine may be provided for a particular topology configuration. However, it should be understood that information for all possible changes in topology may not be predictable. Regardless, where multiple ML engines are provided or otherwise preconfigured for a specific topology, suitable priority levels and rules may also be implemented in order to select a particular ML engine with respect to a detected network change that results in the specific topology.

As illustrated, a rule-based ML selector module 582A may include or otherwise operate with, among others, a database of a plurality of rules 588A, a database of ML engines 588B and a database of rule priority levels 588C. In accordance with the teachings herein, topology class information 584 as well as network adjacency information 586 (either in a matrix form, in a vector form, or a string of values, etc.) may be provided as control inputs to the rule-based ML selector module 582A depending on any detected changes in the network. Responsive thereto, the ML selector module 582A may employ a suitable selection mechanism (e.g., to apply rules and resolve any contention among multiple rule priorities, etc.) to indicate, obtain, or otherwise provide a particular ML engine 589 as output, which may be deployed for fault analysis and diagnostics in the network. Accordingly, in some embodiments, the decision for changing an ML engine or model to be used for FAD management may be given or taken after querying the rules and priority levels provided with the ML engine selector 582A. Depending on implementation, rules may be configured by the operator or another ML algorithm or model can be used to construct rules. An example rule can be given as follows in a simple illustrative scenario: change the FAD ML engine from engine X to engine Y whenever the number of connections between the core nodes and intermediate nodes exceed 6, where 6 is configurable. As an example with respect to the topological transformation shown in FIG. 5C, it can be seen that by the addition of a new node (Node 7) having a new link to Node 5, there are two connections between intermediate and core nodes at time=[T+1]. Assuming that 6 is configured to be 1, the analyzer will be informed by the ML engine selector 582A to change the ML engine to engine Y since the core-intermediate connections in the resultant network is greater than 1.

Skilled artisans will recognize upon reference hereto that the frequency at which the topology information may be retrieved can be determined externally by operator policies and/or based on the requirements. As optimal ML engines for different topologies are preconfigured, the ML engine selector may be adapted to switch to a different ML engine, which may be more suitable and optimal to the detected topology change, with the assistance of a set of defined rules that can vary from relatively simple rules (e.g., link/node thresholds) to highly complex rule constellations.

In another example embodiment, a relatively complex rule may be provided to limit the number of edge nodes that have only one connection. This rule concerning the increase in the number of edge nodes with only one connection to intermediate node is descriptive of a situation where the star topology tends to be used more in the network. Accordingly, an ML engine may be configured to switch to another ML engine depending on a rule or combination such as, e.g., exceeding a maximum number threshold k and/or decreasing below minimum number threshold d for the number of edges. As noted above, there can be a combination of rules operative in concert in an ML engine selector and such rules may be used for determining the maximum and minimum thresholds for the number of physical/virtual links and/or number of nodes. In some embodiments, a training period may be applied to the new ML engine each time the topology changes. Thereafter, the ML-based fault analyzer is informed about or provided with the new ML engine, which may be used for root cause analysis with respect to any future faults detected in the network.

In some arrangements, a classification of the nodes, e.g., as set forth in the foregoing description, may also be used in conjunction with an ML engine selection process in order to limit the number of possible rule combinations and to track major topology changes (between classes, i.e., inter-class) and minor topology changes (within class, i.e., intra-class). In this way, when a major change is detected, the major change may be configured to override any minor change(s). Such overrides may be manual and/or automated, and may also be configured to interact with the rule priority levels of a rule-based selector to overcome possible rule/class conflicts that may be encountered in or caused due to a network topological transformation.

Figure 5E:
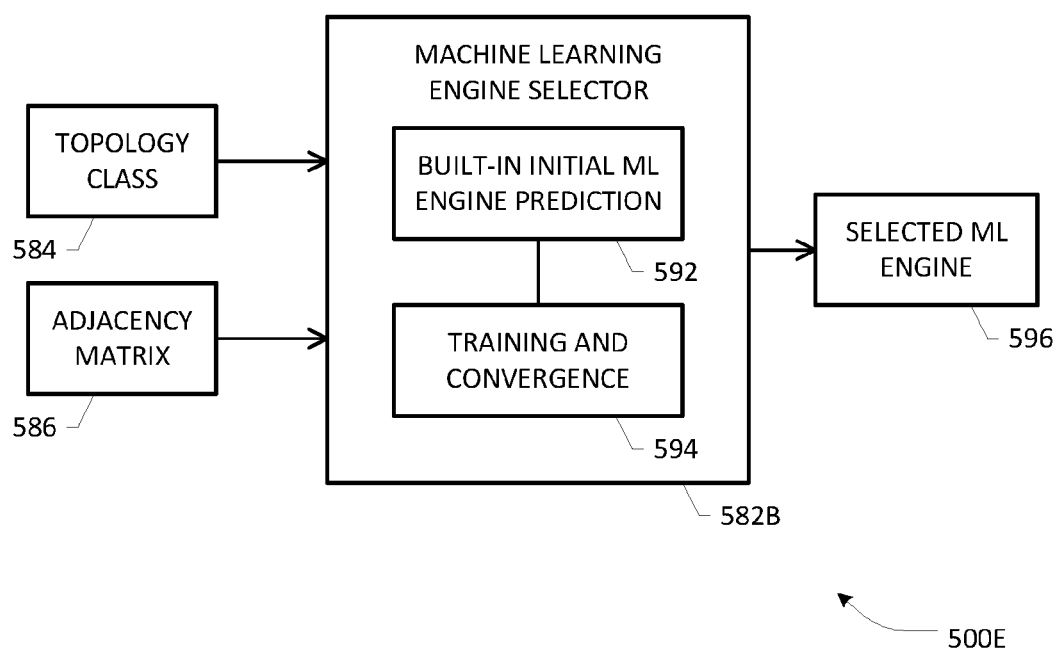
FIG. 5E depicts an example built-in ML engine selector scheme based on dynamic prediction of an initial ML engine according to one embodiment of the present invention.

Although rule-based ML engine selection schemes may be designed to be quite sophisticated, not all network transformations yield preconfigured topologies in a predictable manner. Accordingly, additional and/or alternative embodiments herein provide an ML engine selection system where two levels of ML may be implemented such that an ML engine may be trained for predicting an ML engine that should be used for fault analysis depending on the detected topology configuration. In such an arrangement, which may be referred to herein as a "built-in ML-based selector" system, a topology-specific ML engine may be dynamically generated and trained accordingly, as there are no preconfigured pools of ML engines to select from. FIG. 5E depicts an example built-in ML-based selector system 500E based on dynamic prediction of an initial ML engine according to one embodiment of the present disclosure. An ML-based selector module 582B may be configured to operate responsive to, among others, network topology information 584, adjacency information 586, etc., as well as KPI requirement data in some embodiments, as set forth previously. Responsive thereto, a built-in ML engine 592 is operative to predict an initial ML engine for fault analysis. The predicted ML engine may then be trained until certain level of convergence is achieved, as set forth in block 594. The trained ML engine may be provided as the selected ML engine 596, which may be deployed in conjunction with a fault analysis and diagnostics module for performing root cause determination with respect to any faults detected in the network.

In some embodiments, built-in ML engine 592 may also be trained with different topologies prior to deployment for predicting topology-specific ML engines optimized for fault analysis. Generally, the built-in ML engine 592 may be trained by individual topologies in classes, wherein the learning method can be based on techniques as deep learning, ensemble learning (e.g., apply the algorithm which is selected as majority), etc. Accordingly, both the topology information and the appropriate algorithm could be known in advance according to some embodiments. In addition, when an unknown topology is constituted in a network transformation, the built-in ML engine 592 may be configured to trigger an appropriate ML analysis method as an initial prediction. As one skilled in art will readily appreciate, built-in ML engine 592 and subsequent predicted ML engines for fault analysis may be trained separately, using different training test data, and at different levels of frequency. In still further embodiments, some aspects of both rule-based selection and built-in ML-based selection may be implemented in a suitable combination, potentially changing from one methodology to another in certain dynamically modulated ML selection arrangements.

Figure 6A:
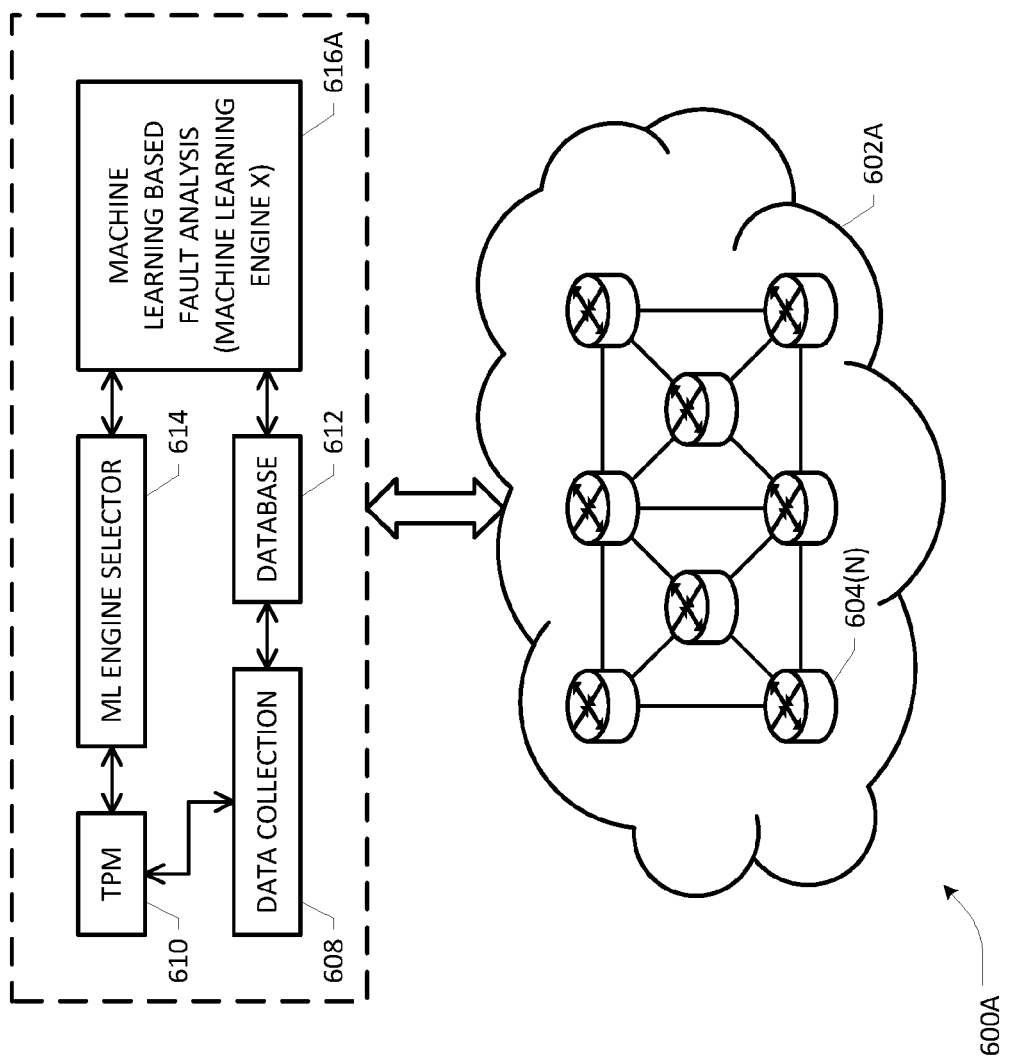
FIGS. 6A-6C depict example network environments with three different topologies wherein an ML engine selector may be configured to provide three different ML engines for facilitating fault management with respect to corresponding network architectures.
Figure 6B:
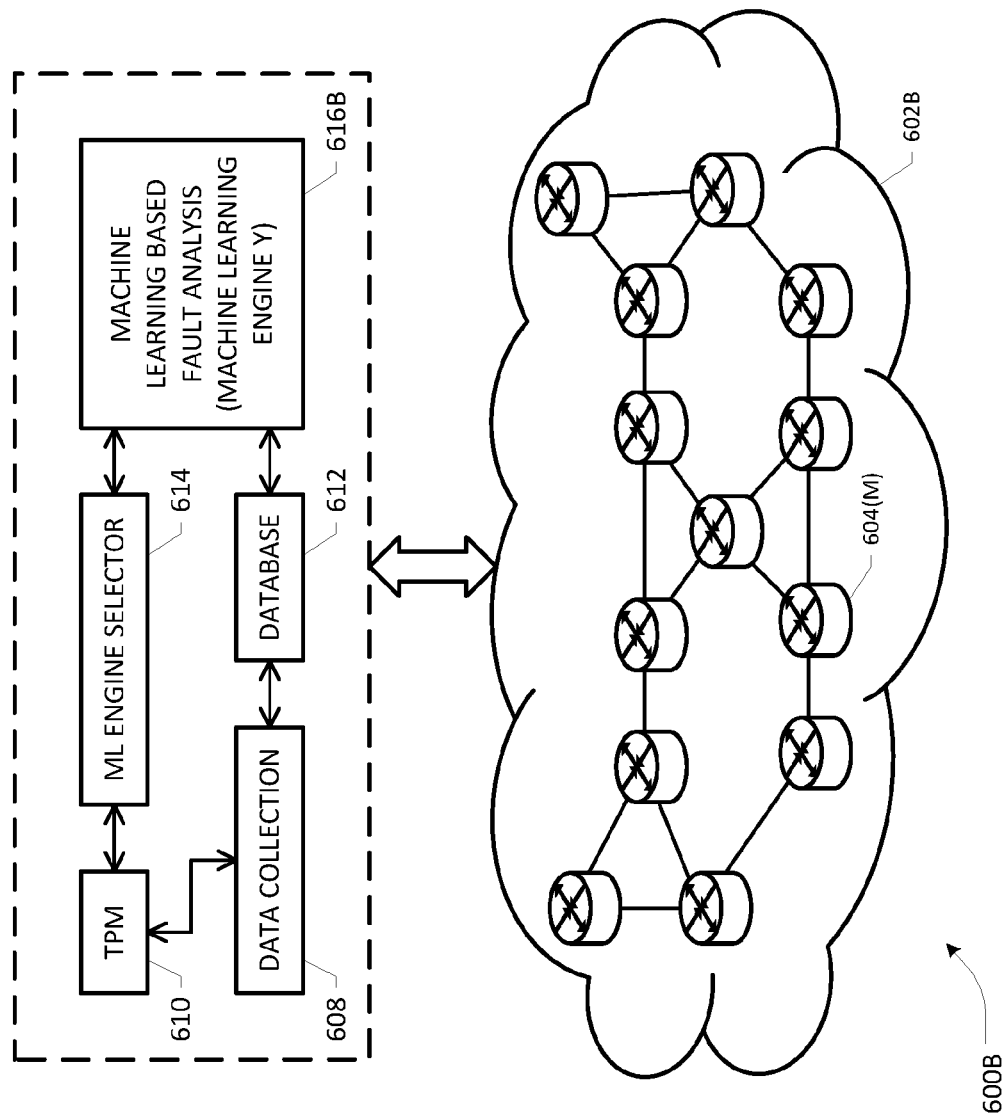
Figure 6C:
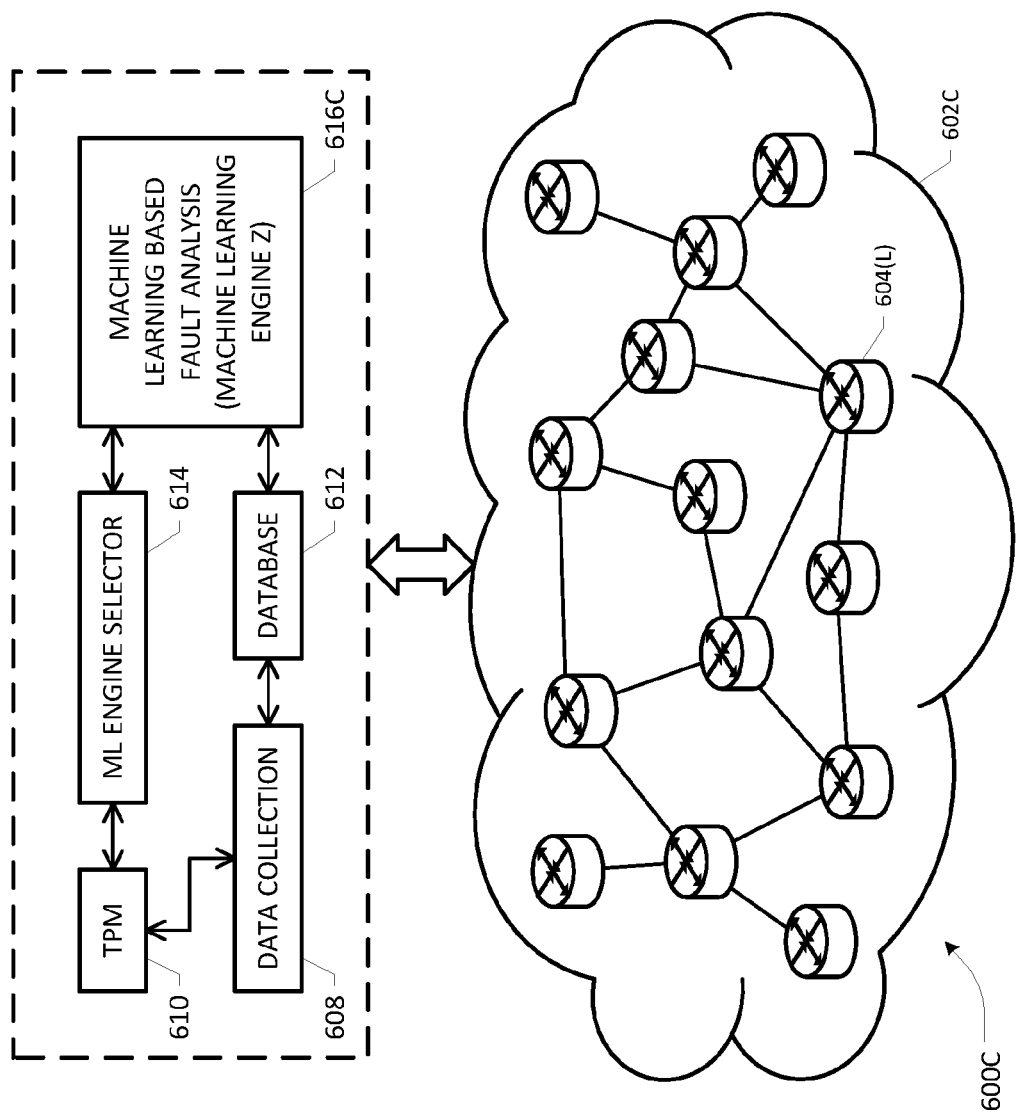

FIGS. 6A-6C depict example network environments with three different topologies wherein an ML engine selector may be configured to provide three different ML engines for facilitating fault management with respect to corresponding network architectures. Similar to the embodiment set forth in FIG. 1A, each network environment 600A, 600B, 600C includes a management system having components comprising a topology/performance monitor and manager 610, a data collector 608, a database 612 and an ML engine selector 614 provided according to the teachings herein. Each environment comprises a different network 602A, 602B, 602C, wherein each network may include a different number of nodes and a different topology. As illustrated, network 602A comprises nodes 604(N), network 602B comprises nodes 604(M), and network 602C comprise nodes 602(L). ML engine selector 614 is operative to select, generate, otherwise provide a different ML engine X, Y, or Z operative with a respective fault analysis module 616A, 616B, 616C corresponding to each network 602A, 602B, 602C according to the embodiments herein. It will be apparent that although non-SDN architectures are illustrated in FIGS. 6A-6C, a similar ML engine selection process may also be effectuated in SDN-based network environments.

Figure 7A:
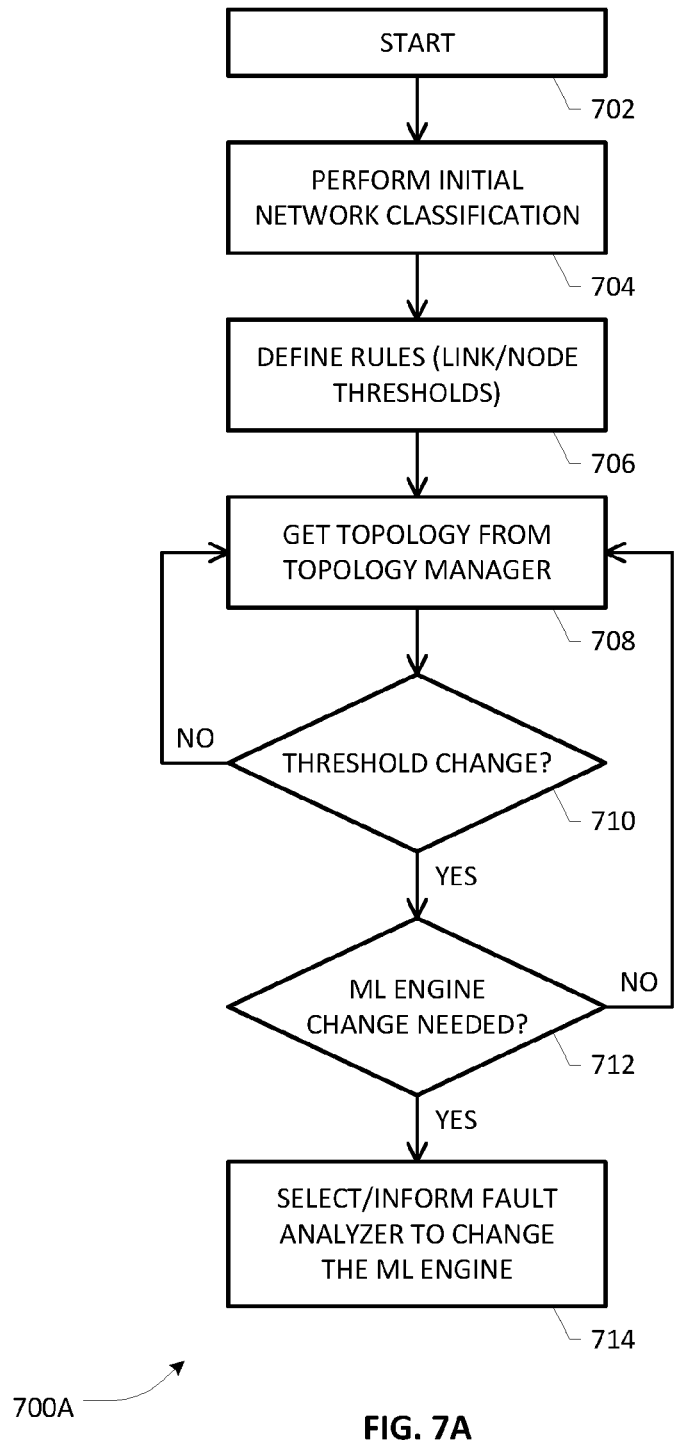
FIGS. 7A and 7B are flowcharts of various blocks, steps and/or acts that may be (re)combined in one or more arrangements, with or without additional flowcharts of the present disclosure, for facilitating rule-based ML engine selection according to the teachings herein.
Figure 7B:
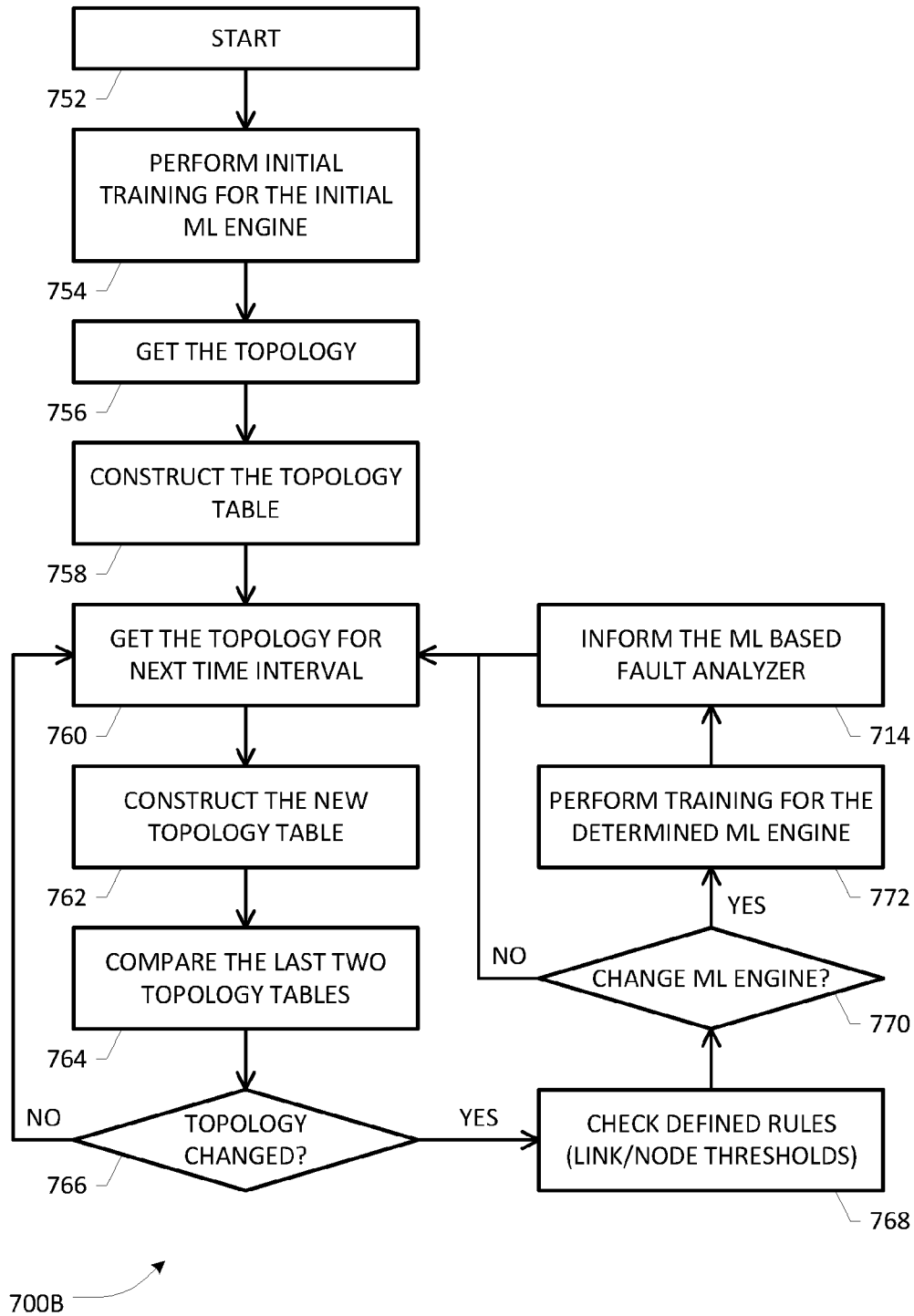

FIGS. 7A and 7B are flowcharts of various blocks, steps and/or acts that may be (re)combined in one or more arrangements, with or without additional flowcharts of the present disclosure, for facilitating rule-based ML engine selection with respect to network fault management according to some example embodiments herein. Process flow 700A shown in FIG. 7A exemplifies an overall process that may be configured to commence at or during an initial deployment of a network (block 702). At block 704, initial network classification may be performed. At block 706, various selection rules (e.g., link/node thresholds, rule priorities, etc.) may be determined, defined, retrieved, or otherwise obtained. At block 708, the network topology may be determined, defined, retrieved, or otherwise obtained. As noted previously, network topological information and KPI information may be obtained periodically, offline or quasi-online, and/or responsive to an event- or policy-triggered mechanism. At block 710, a determination may be made as to whether there is a topological change. Responsive to determining that there is a topological change, a further determination may be made as to whether a new ML engine is needed (block 712). If so, an optimal ML engine may be selected from a pool of preconfigured ML engines, which may be provided to the network's fault analyzer so that a current ML engine is changed to the new optimal ML engine, as set forth at block 714. If there was no topology change detected (block 710) or there is no need for a new ML engine with respect to the detected topology change (block 712), process flow control may return to block 708 in a return loop. In some embodiments, process flow control may also return to block 708 after selecting a new ML engine and informing the network fault analyzer at block 714.

Process flow 700B shown in FIG. 7B exemplifies additional steps, blocks and/acts that may be executed within a rule-based ML engine selector, e.g., as part of and/or in association with process flow 700A according to one embodiment. Upon starting (block 752), initial training may be performed for an initial ML engine (block 754), which may be optionally provided in some arrangements. Network topology is retrieved or otherwise obtained at block 756. Responsive thereto, a topology table may be constructed (block 758). After a certain time has elapsed or due to an event-triggered control input, the topology information is retrieved or otherwise obtained at a subsequent time (block 760). At block 762, a new topology table is constructed. At block 764, a comparison between the last two consecutive topologies may be performed. If there is a topology change of sufficient degree, magnitude or other threshold (block 766), a rules/priorities database may be queried (block 768). Responsive to determining that the current ML engine deployed for fault management needs to be changed, a new ML engine is selected, which may undergo a training phase in some embodiments. The foregoing to acts are set forth at blocks 770 and 772. Thereafter, the ML-based network fault analyzer may be informed of the new ML engine, as noted previously (block 714). Further, appropriate return paths may be provided from decision block 766 (determining that there is no sufficient change in the topology) and decision block 770 (determining that there is no need to change the current ML engine) to block 760.

Figure 8A:
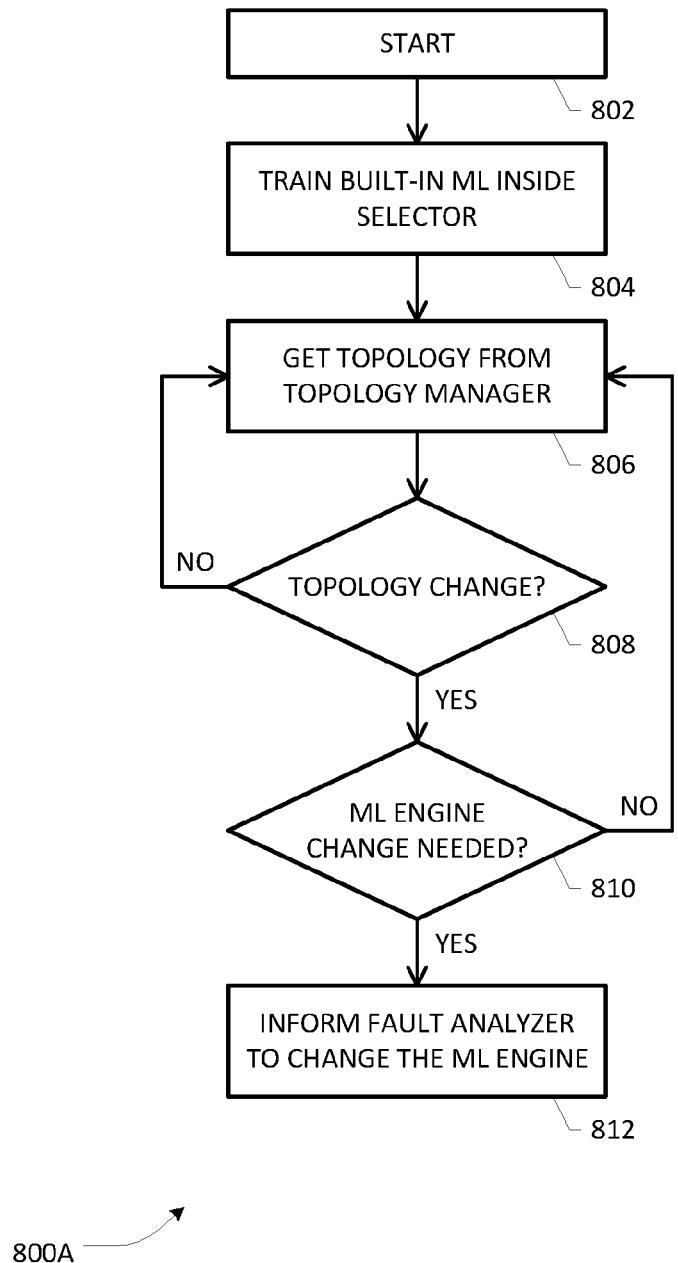
FIGS. 8A and 8B are flowcharts of various blocks, steps and/or acts that may be (re)combined in one or more arrangements, with or without additional flowcharts of the present disclosure, for facilitating built-in ML-based ML engine selection according to the teachings herein.
Figure 8B:
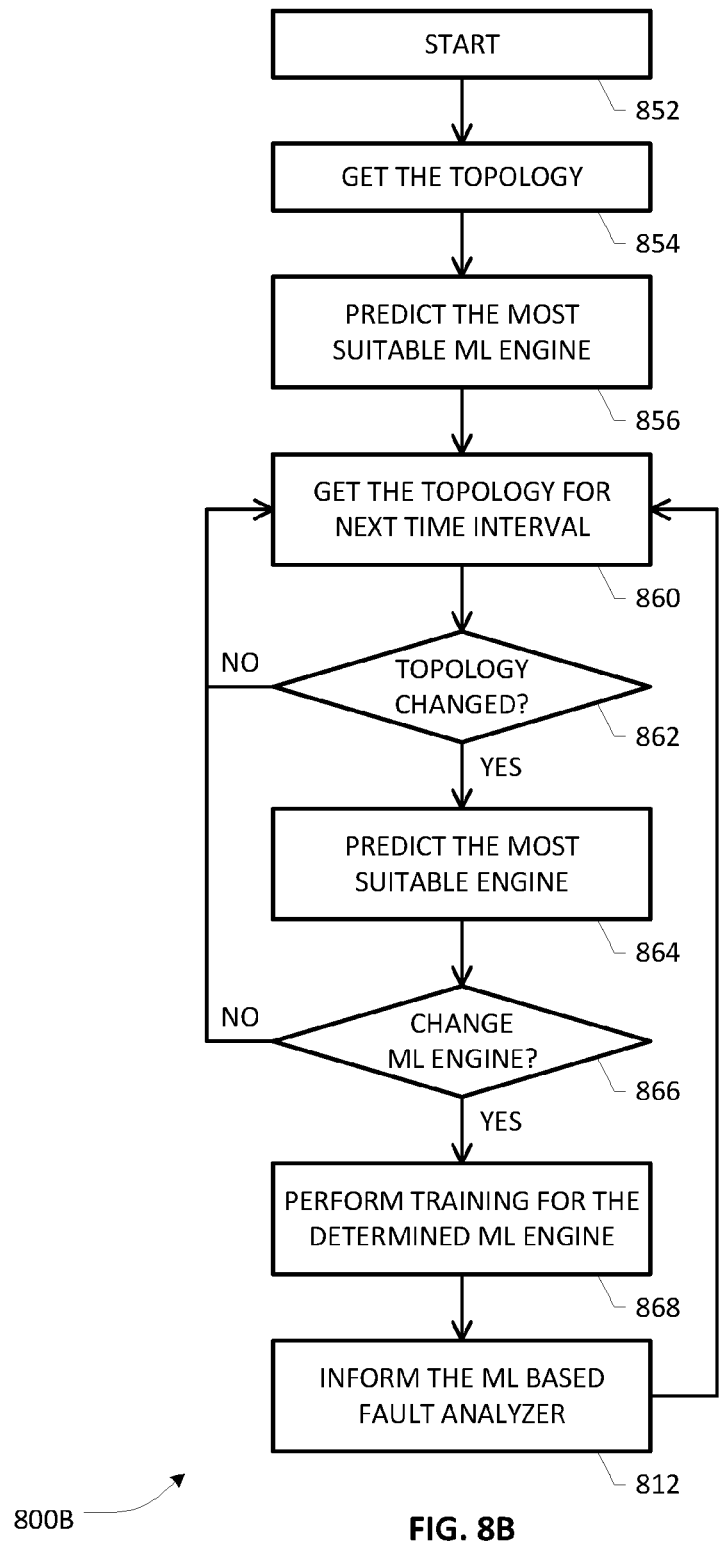

FIGS. 8A and 8B are flowcharts of various blocks, steps and/or acts that may be (re)combined in one or more arrangements, with or without additional flowcharts of the present disclosure, for facilitating built-in ML-based ML engine selection with respect to network fault management according to some example embodiments herein. It will be apparent that process flow 800A of FIG. 8A is substantially similar to process flow 700A set forth above, mutatis mutandis. Among the salient differences is training a built-in ML selector at block 804 upon commencing process flow at block 802. As before, topology information may be obtained from a topology manager at different times (block 806), which may be acted upon for ML engine selection as set forth at blocks 808, 810. Thereafter, the ML-based network fault analyzer may be informed of and/or provided with the new ML engine (block 812) for facilitating FAD management in the network.

Process flow 800B shown in FIG. 8B exemplifies a sub-process of additional steps, blocks and/acts that may be executed within a built-in ML-based selector, e.g., as part of and/or in association with process flow 800A according to one embodiment. Upon starting (block 852), a network topology may be retrieved or otherwise obtained (block 854). A suitable initial ML engine may be predicted responsive thereto, which may be trained as needed (block 856). After a certain time has elapsed or due to an event-triggered control input, the topology information is retrieved or otherwise obtained at a subsequent time (block 860). If there is a topology change of sufficient degree, magnitude or other threshold (block 862), a suitable ML engine is predicted at the subsequent time (block 864). Responsive to determining that the current ML engine deployed for fault management needs to be changed, the ML engine predicted at the subsequent time is trained, as set forth at blocks 866, 868. Thereafter, the ML-based network fault analyzer may be informed of the new ML engine, as previously set forth (block 812). Similar to the embodiments described above, appropriate return paths may be provided from decision block 862 (determining that there is no sufficient change in the topology) and decision block 866 (determining that there is no need to change the current ML engine) to block 860 in an iterative fashion.

Figure 9:
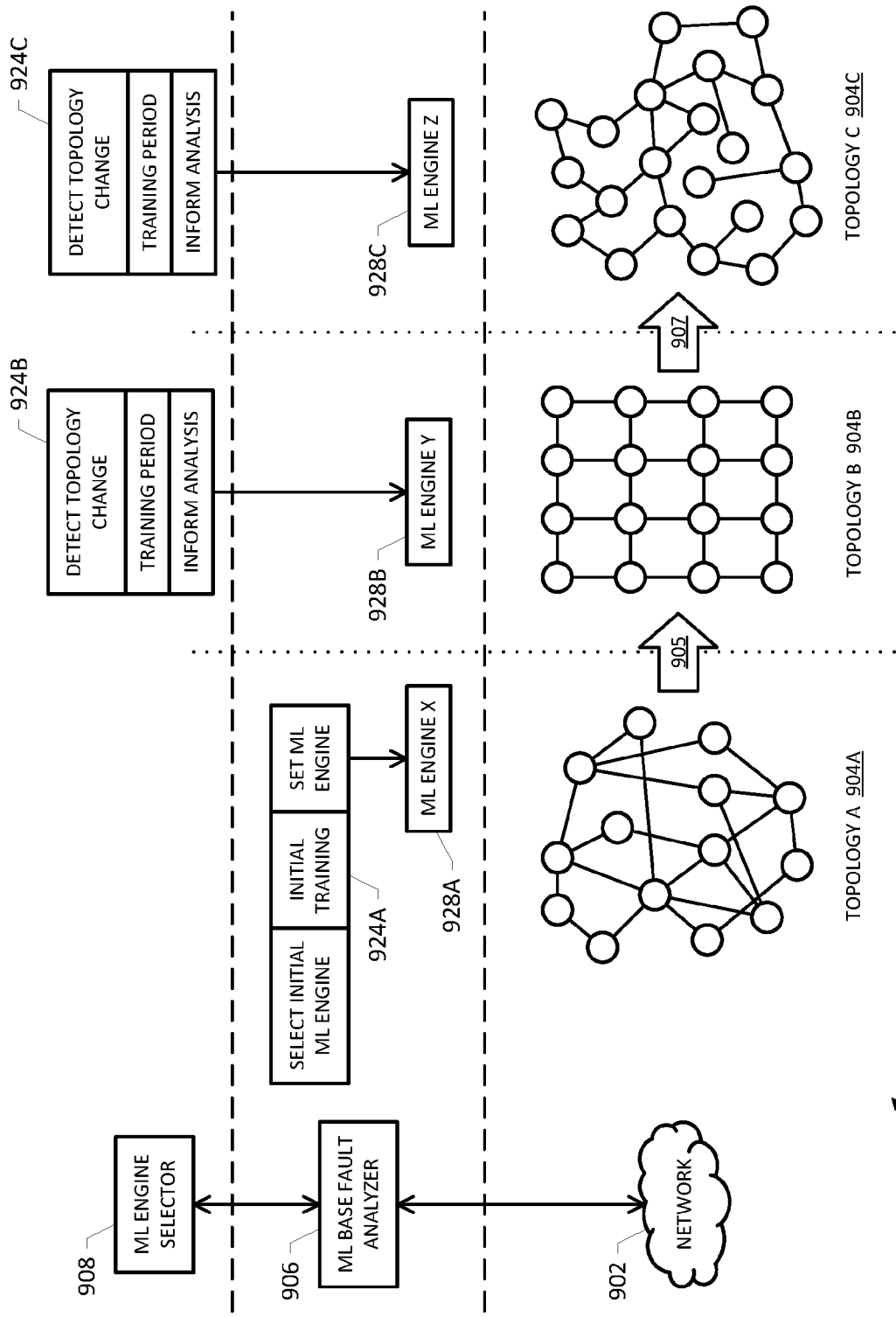
FIG. 9 illustrates a temporal schema exemplifying various interactions relative to topological changes, ML-based fault analysis and management, and ML engine selection in an example network environment according to an embodiment of the present disclosure.

FIG. 9 illustrates a temporal schema 900 exemplifying various interactions relative to topological changes, ML-based fault analysis and management, and ML engine selection in an example network environment according to an embodiment of the present disclosure. As illustrated, a network 902 may be managed according to an ML-based fault analysis system 906 interfaced with an ML engine selector system 908. During an initial time period, network 902 has a topology (Topology-A) 904A, which may be transitioned to Topology-B 904B and Topology-C 904C at subsequent times pursuant to respective transitions 905, 907. The ML engine selector system 908 is operative to execute a selection process 924A, 924B, 924C for each of time periods, each selection process comprising selecting an ML engine, performing initial training, setting the ML engine, and informing the fault analysis system 906. As exemplified, ML engine 928A is set/provided for the initial time period with respect to topology 904A, whereas ML engines 928B and 928C are set/provided for topologies 904B and 904C at corresponding subsequent time periods.

Figure 10:
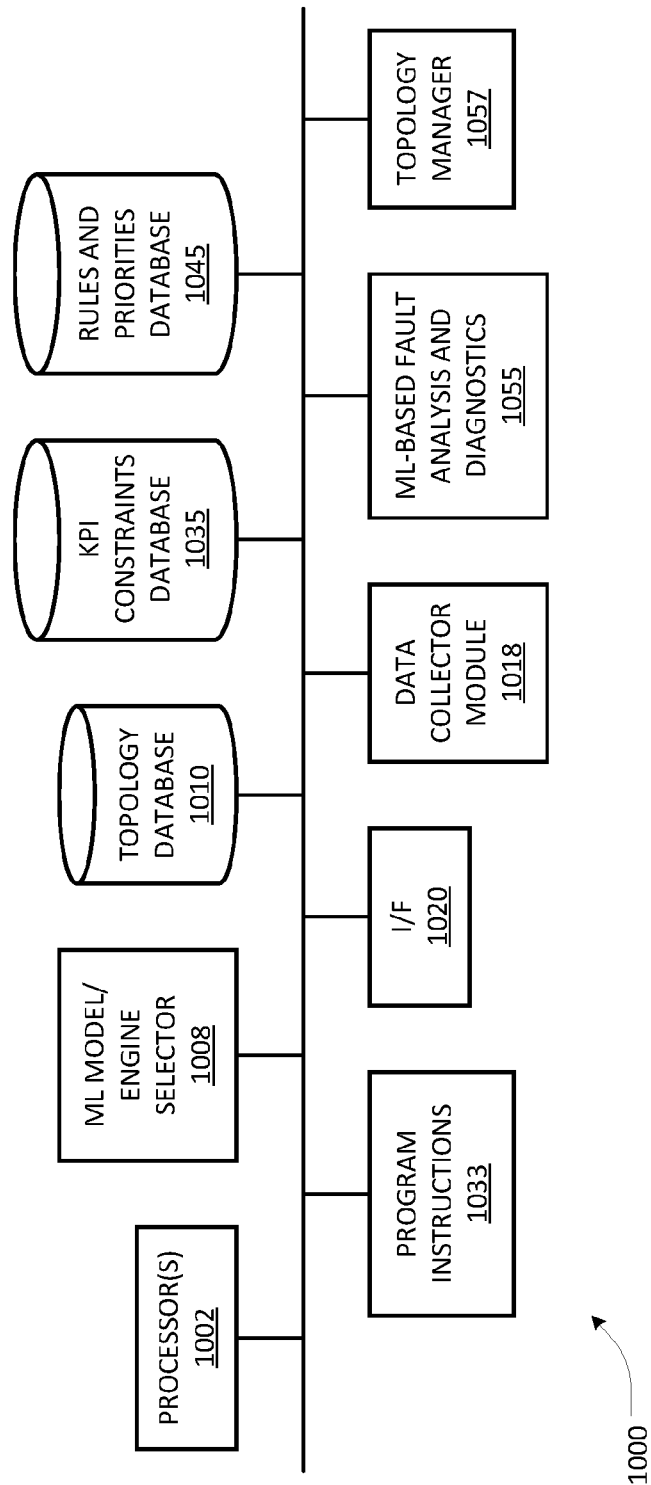
FIG. 10 depicts a block diagram of an apparatus, node, or network element configured to facilitate ML engine selection and ML-based fault analysis and management in an example network environment according to an embodiment of the present disclosure.

Turning to FIG. 10, a block diagram of a computer-implemented apparatus 1000 is illustrated therein, which may be (re)configured and/or (re)arranged as a platform, (sub)system, server, node or element to effectuate an example management network infrastructure for topology monitoring, management, ML engine model training, and ML engine selection according to one or more embodiments of the present patent disclosure. It should be appreciated that apparatus 1000 may be implemented as a distributed data center platform or as a standalone node in some arrangements. One or more processors 1002 may be operatively coupled to various modules that may be implemented in persistent memory for executing suitable program instructions or code portions (e.g., code portion 1033) with respect to effectuating any of the processes, methods and/or flowcharts set forth hereinabove in association with one or more modules, e.g., ML-based fault analysis and diagnostics module 1055, topology manager 1057, as well as a data collector module 1018, topology database 1010, KPI database 1035, rules and priorities database 1045 and ML engine/model selector 1008 according to the embodiments described herein. Although not specifically shown herein, one or more domain expert systems and/or Big Data analytics modules may also be interfaced with apparatus 1000. Accordingly, depending on the implementation, appropriate "upstream" interfaces (I/F) and and/or "downstream" I/Fs, collectively I/F 1020 may be provided for interfacing with various components and network nodes, including, e.g., routers, switches, bridges, brouters, terrestrial mobile communications infrastructure nodes/elements, NTN infrastructure nodes/elements, access network nodes, core network nodes, service provider network nodes, data center nodes, management nodes, SDN controllers, BSS nodes and/or other OSS components, etc., wherein such interfaces may be referred to as a first interface, a second interface, and so on, depending on configuration, implementation and/or to architectural design.

Figure 11:
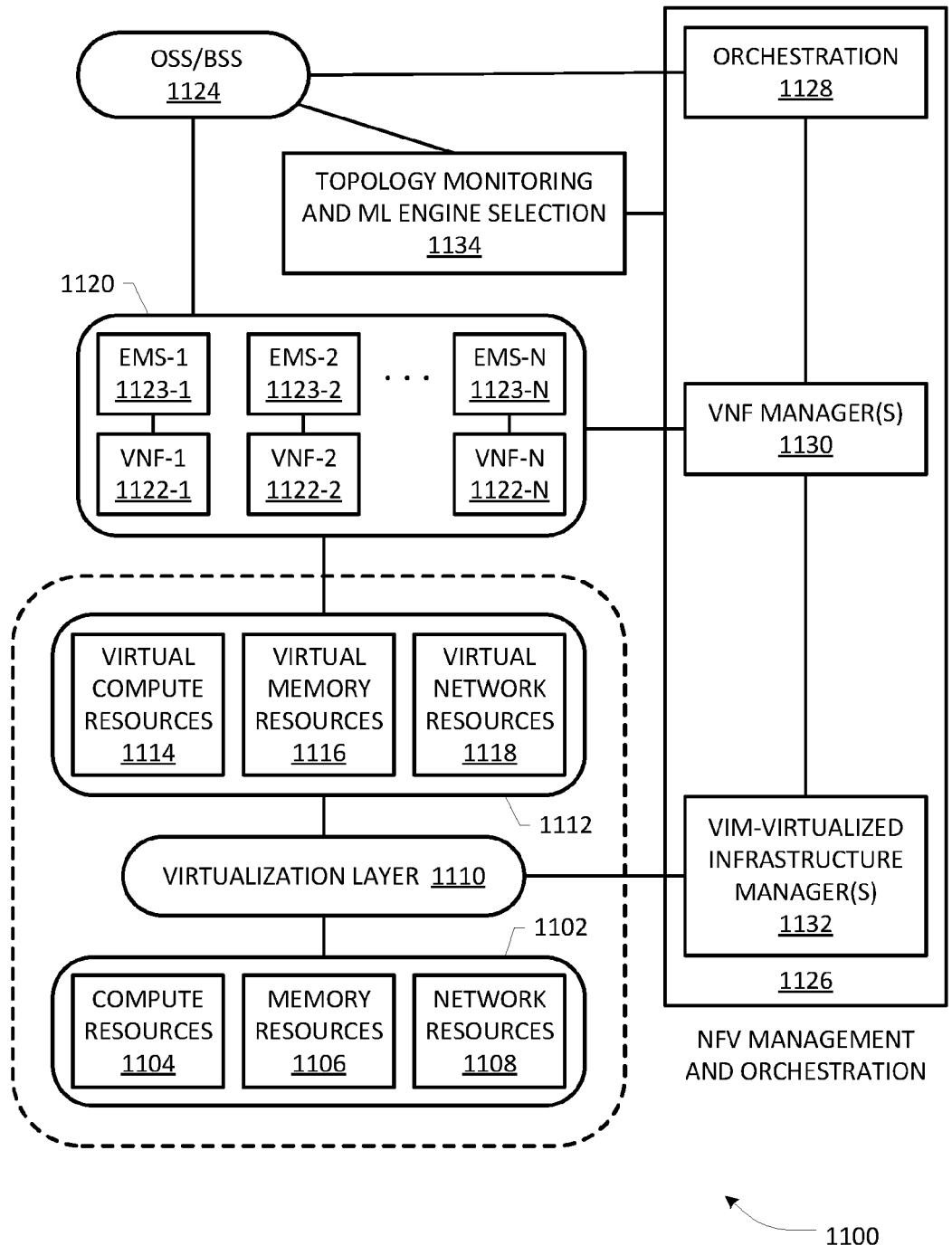
FIG. 11 depicts a network virtualization environment wherein an embodiment of the present patent disclosure may be practiced in accordance with the teachings herein.

FIG. 11 depicts a Network Function Virtualization (NFV) architecture 1100 that may be applied in conjunction with an OSS and ML engine selection configured to select appropriate ML engines/models depending on changes in network topology and/or KPI requirements and performance constraints. Various physical resources and services executing thereon within the network environment may be provided as virtual appliances wherein the resources and service functions are virtualized into suitable virtual network functions (VNFs) via a virtualization layer 1110. Resources 1102 comprising compute resources 1104, memory resources 1106, and network infrastructure resources 1108 are virtualized into corresponding virtual resources 1112 wherein virtual compute resources 1114, virtual memory resources 1116 and virtual network resources 1118 are collectively operative to support a VNF layer 1120 including a plurality of VNFs 1122-1 to 1122-N, which may be managed by respective element management systems (EMS) 1123-1 to 1123-N. Virtualization layer 1110 (also sometimes referred to as virtual machine monitor (VMM) or "hypervisor") together with the physical resources 1102 and virtual resources 1112 may be referred to as NFV infrastructure (NFVI) of a network environment. Overall NFV management and orchestration functionality 1126 may be supported by one or more virtualized infrastructure managers (VIMs) 1132, one or more VNF managers 1130 and an orchestrator 1128, wherein VIM 1132 and VNF managers 1130 are interfaced with NFVI layer and VNF layer, respectively. An OSS platform 1124 (which may be integrated or co-located with a BSS infrastructure in some arrangements) is responsible for network-level functionalities such as network management, fault management, configuration management, service management, and subscriber management, etc. In one arrangement, various OSS components of the OSS platform 1124 may interface with VNF layer 1120 and NFV orchestration 1128 via suitable interfaces. In addition, OSS/BSS 1124 may be interfaced with a topology manager and ML engine selection module 1134 for facilitating topology-specific ML model for fault analysis, diagnostics, etc., within a network. In general, NFV orchestration 1128 may involve generating, maintaining and tearing down of network services or service functions supported by corresponding VNFs, including creating end-to-end services over multiple VNFs in a network environment, (e.g., allocation of resources, ports, etc.). Further, NFV orchestrator 1128 may also be responsible for global resource management of NFVI resources, e.g., managing compute, storage and networking resources among multiple VIMs in the network.

Based on the foregoing, it should be appreciated that in the context of the present application, the topology management and ML engine selection functionality associated to with an OSS platform such as OSS 1124 may also be configured in an example embodiment to access suitable OSS components that may be mapped to different hierarchical information layers based on how the virtualized resources are organized in accordance with NFVI. It will be apparent that because the physical resources allocated to a VNF are considered to be elastic and the VNFs can run on multiple physical infrastructure network nodes, there is a loose coupling between the VNFs and the physical infrastructure hardware nodes they exist on, which allows greater scalability and dynamic configurability of a virtualized network environment. Consequently, the databases provided with different OSS components (based on the different hierarchical layers to which they are mapped) may need to be dynamically reconfigured as the underlying topologies change.

Figure 12A:
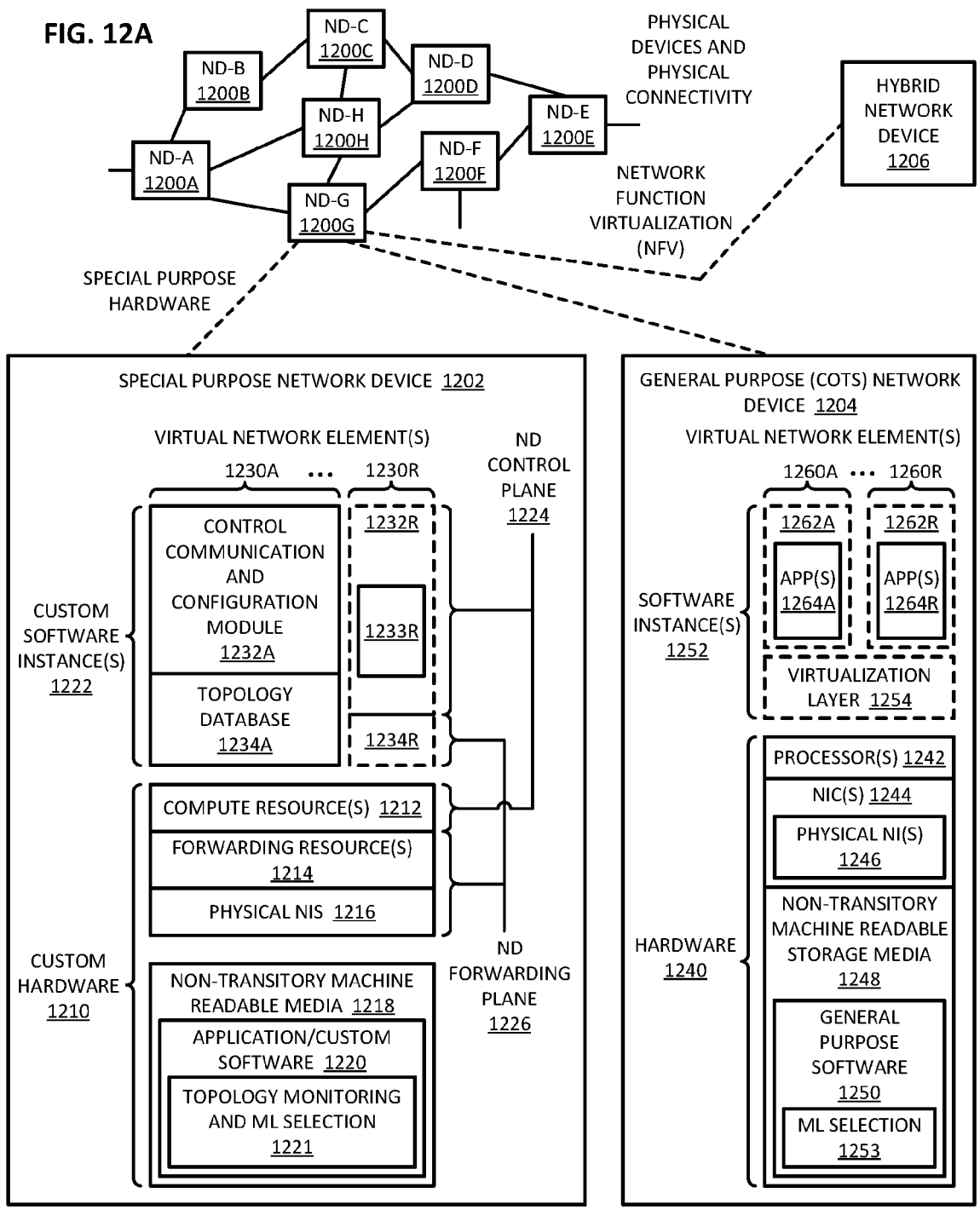
FIGS. 12A and 12B illustrate connectivity between network devices (NDs) or nodes within an exemplary network, as well as three exemplary implementations of the NDs, wherein ML-based fault analysis and management may be provided according to some embodiments of the present invention.

FIGS. 12A/12B illustrate connectivity between network devices (NDs) within an exemplary network, as well as three exemplary configurations of the NDs, that may be implemented in a virtualized environment. In particular, FIG. 12A shows NDs 1200A-H, which may be representative of various servers, database nodes, OSS components, external storage nodes, as well as other network elements of a network environment (e g, management nodes, routers, switches, access nodes, core nodes, and the like), wherein example connectivity is illustrated by way of lines between A-B, B-C, C-D, D-E, E-F, F-G, and A-G, as well as between H and each of A, C, D, and G. As noted elsewhere in the patent application, such NDs may be provided as physical devices, and the connectivity between these NDs can be wireless or wired (often referred to as a link). An additional line extending from NDs 1200A, E, and F illustrates that these NDs may act as ingress and egress nodes for the network (and thus, these NDs are sometimes referred to as edge NDs; while the other NDs may be called core NDs).

Two of the exemplary ND implementations in FIG. 12A are: (1) a special-purpose network device 1202 that uses custom application-specific integrated-circuits (ASICs) and a proprietary operating system (OS); and (2) a general purpose network device 1204 that uses common off-the-shelf (COTS) processors and a standard OS. The special-purpose network device 1202 includes appropriate hardware 1210 (e.g., custom or application-specific hardware) comprising compute resource(s) 1212 (which typically include a set of one or more processors), forwarding resource(s) 1214 (which typically include one or more ASICs and/or network processors), and physical network interfaces (NIs) 1216 (sometimes called physical ports), as well as non-transitory machine readable storage media 1218 having stored therein suitable application-specific software or program instructions 1220 (e.g., topology monitoring and ML model selection/optimization 1221, etc.). A physical NI is a piece of hardware in an ND through which a network connection (e.g., wirelessly through a wireless network interface controller (WNIC) or through plugging in a cable to a physical port connected to a network interface controller (NIC)) is made, such as those shown by the connectivity between NDs 1200A-H. During operation, the application software 1220 may be executed by the hardware 1210 to instantiate a set of one or more application-specific or custom software instance(s) 1222. Each of the custom software instance(s) 1222, and that part of the hardware 1210 that executes that application software instance (be it hardware dedicated to that application software instance and/or time slices of hardware temporally shared by that application software instance with others of the application software instance(s) 1222), form a separate virtual network element 1230A-R. Each of the virtual network element(s) (VNEs) 1230A-R includes a control communication and configuration module 1232A-R (sometimes referred to as a local control module or control communication module) and forwarding table(s) 1234A-R with respect to suitable application/service instances 1233A-R, such that a given virtual network element (e.g., 1230A) includes the control communication and configuration module (e.g., 1232A), a set of one or more forwarding table(s) (e.g., 1234A), and that portion of the application hardware 1210 that executes the virtual network element (e.g., 1230A) for supporting the application instance 1233A (e.g., collecting network data and the like in relation to performing topology monitoring, ML model selection, etc. in view of system virtualization).

Software 1220 can include code such as topology monitoring and ML engine selection module 1221, which when executed by networking hardware 1210 operating as a management node, causes the special-purpose network device 1202 to perform operations of one or more embodiments of the present invention as part of networking software instances 1222.

In an example implementation, the special-purpose network device 1202 is often physically and/or logically considered to include: (1) a ND control plane 1224 (sometimes referred to as a control plane) comprising the compute resource(s) 1212 that execute the control communication and configuration module(s) 1232A-R; and (2) a ND forwarding plane 1226 (sometimes referred to as a forwarding plane, a data plane, or a bearer plane) comprising the forwarding resource(s) 1214 that utilize the forwarding or destination table(s) 1234A-R and the physical NIs 1216. By way of example, where the ND is a virtual OSS node, the ND control plane 1224 (the compute resource(s) 1212 executing the control communication and configuration module(s) 1232A-R) is typically responsible for participating in topology monitoring and effectuating ML model/engine selection. Likewise, ND forwarding plane 1226 is responsible for receiving that data on the physical NIs 1216 and forwarding that data out the appropriate ones of the physical NIs 1216 based on the forwarding information.

Figure 12B:
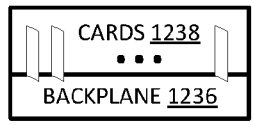

FIG. 12B illustrates an exemplary way to implement the special-purpose network device 1202 according to some embodiments of the invention, wherein an example special-purpose network device includes one or more cards 1238 (typically hot pluggable) coupled to an interconnect mechanism. While in some embodiments the cards 1238 are of two types (one or more that operate as the ND forwarding plane 1226 (sometimes called line cards), and one or more that operate to implement the ND control plane 1224 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway), etc.). By way of example, a service card may be used to terminate IPsec tunnels and execute the attendant authentication and encryption algorithms. These cards may be coupled together through one or more interconnect mechanisms illustrated as backplane 1236 (e.g., a first full mesh coupling the line cards and a second full mesh coupling all of the cards).

Returning to FIG. 12A, an example embodiment of the general purpose network device 1204 includes hardware 1240 comprising a set of one or more processor(s) 1242 (which are often COTS processors) and network interface controller(s) 1244 (NICs; also known as network interface cards) (which include physical NIs 1246), as well as non-transitory machine readable storage media 1248 having stored therein software 1250. During operation, the processor(s) 1242 execute the software 1250 to instantiate one or more sets of one or more applications 1264A-R with respect to facilitating OSS functionalities. While one embodiment does not implement virtualization, alternative embodiments may use different forms of virtualization—represented by a virtualization layer 1254 and software containers 1262A-R. For example, one such alternative embodiment implements operating system-level virtualization, in which case the virtualization layer 1254 represents the kernel of an operating system (or a shim executing on a base operating system) that allows for the creation of multiple software containers 1262A-R that may each be used to execute one of the sets of applications 1264A-R. In this embodiment, the multiple software containers 1362A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1254 represents a hypervisor (sometimes referred to as a virtual machine monitor (VMM) as noted elsewhere in the present patent application) or a hypervisor executing on top of a host operating system; and (2) the software containers 1262A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1264A-R, as well as the virtualization layer 1254 and software containers 1262A-R if implemented are collectively referred to as software instance(s) 1252. Each set of applications 1264A-R, corresponding software container 1262A-R if implemented, and that part of the hardware 1240 that executes them (be it hardware dedicated to that execution and/or time slices of hardware temporally shared by software containers 1262A-R), forms a separate virtual network element(s) 1260A-R.

The virtual network element(s) 1260A-R perform similar functionality to the virtual network element(s) 1230A-R— e.g., similar to the control communication and configuration module(s) 1232A and forwarding table(s) 1234A (this virtualization of the hardware 1240 is sometimes referred to as Network Function Virtualization (NFV) architecture, as set forth previously. Thus, NFV may be used to consolidate many network equipment types onto industry standard high volume server hardware, physical switches, and physical storage, which could be located in data centers, NDs, and customer premise equipment (CPE). However, different embodiments of the invention may implement one or more of the software container(s) 1262A-R differently. For example, while embodiments of the invention may be practiced in an arrangement wherein each software container 1262A-R corresponds to one VNE 1260A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1262A-R to VNEs also apply to embodiments where such a finer level of granularity is used.

In certain embodiments, the virtualization layer 1254 may include a virtual switch that provides similar forwarding services as a physical Ethernet switch. Specifically, this virtual switch forwards traffic between software containers 1262A-R and the NIC(s) 1244, as well as optionally between the software containers 1262A-R. In addition, this virtual switch may enforce network isolation between the VNEs 1260A-R that by policy are not permitted to communicate with each other (e.g., by honoring virtual local area networks (VLANs)).

Software 1250 can include code such as topology monitoring, ML model selection, which when executed by networking hardware 1240, causes the general-purpose network device 1204 to perform operations of one or more embodiments of the present invention as part of software instances 1253, wherein ND 1204 may be configured as a management node of the network.

The third exemplary ND implementation in FIG. 12A is a hybrid network device 1206, which may include both custom ASICs/proprietary OS and COTS processors/standard OS in a single ND or a single card within an ND. In certain embodiments of such a hybrid network device, a platform VM (i.e., a VM that implements the functionality of the special-purpose network device 1202) could provide for para-virtualization to the application-specific hardware present in the hybrid network device 1206 for effectuating one or more components, blocks, modules, and functionalities of an OSS platform.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1230A-R, VNEs 1260A-R, and those in the hybrid network device 1206) receives data on the physical NIs (e.g., 1216, 1246) and forwards that data out the appropriate ones of the physical NIs (e.g., 1216, 1246).

Accordingly, various hardware and software blocks configured for effectuating an example management node including those associated with topology/KPI monitoring and ML engine selection functionality may be embodied in NDs, NEs, NFs, VNE/VNF/VND, virtual appliances, virtual machines, and the like, as well as electronic devices and machine-readable media, which may be configured as any of the apparatuses described herein. One skilled in the art will therefore recognize that various apparatuses and systems with respect to the foregoing embodiments, as well as the underlying network infrastructures set forth above may be architected in a virtualized environment according to a suitable NFV architecture in additional or alternative embodiments of the present patent disclosure as noted above.

At least a portion of an example network architecture and associated FAD management systems disclosed herein may be virtualized as set forth above and architected in a cloud-computing environment comprising a shared pool of configurable virtual resources. Various pieces of hardware/software associated with topology monitoring, ML engine/model selection and associated ML-based fault analysis/diagnostics may therefore be implemented in a serviceoriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on COTS hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the context of the teachings herein, it should be appreciated that facilitating accurate root cause analysis of faults in network environments such as DC, WAN, etc. is important for fast troubleshooting. By effectuating correct root cause analysis of the faults in accordance with the teachings herein, service interruptions are minimized, whereby revenues generated by using the services in the network will not be negatively affected or only to a minimal degree. Embodiments disclosed herein provide a solution that advantageously realizes the changes in the network at different levels, e.g., link or node level, and changes the ML engine/algorithm/process or the parameters in the ML engine/algorithm/process in respect of fault management. Further advantages of example embodiments may be appreciated in view of the following discussion.

Whereas in some existing cases only one ML model, process or algorithm is used when performing root cause analysis that predicts the main reason for network failures by using ML, example embodiments are directed to providing multiple ML-based engines/models/processes, from which a particular model/process may be advantageously selected in a topology dependent manner. In particular, example embodiments herein may be configured to provide one or more benefits and/or to overcome one or more deficiencies as set forth below.

1. By the virtue of the embodiments set forth herein, any management system that is uses ML techniques may be configured to obtain or provide more accurate fault analysis results. Correct failure root cause analysis using example embodiments can provide more efficient and uninterrupted operation of network services as noted above. Changes at physical/virtual topologies and changes at the node level within the network may be advantageously considered and used in terms of changing the active ML engine in a more adaptive manner.

2. Embodiments of an example system can work both in traditional and SDN based topologies as described above. Additionally, example embodiments can be applied to various types of networking environments such as LANs, WANs, Campus Networks, DC networks, etc. Example embodiments may also be applied to the container or VNF based systems when ML is used for fault analysis, e.g., as set forth above with respect to FIGS. 12A/12B. As skilled artisans will recognize, topology changes can also occur in such VNF based systems, which may be managed using a suitable orchestrator (ETSI MANO, Kubernetes, etc.). Because topology changes in such container/VNF based systems can be a significant issue, especially when/where ML or machine reasoning (MR) may be used for fault analysis, some embodiments herein may be configured to be particularly advantageous with respect to the fault management of the container/VNF based architectures.

3. Example embodiments can be utilized as a Cognitive OSS feature in a data and/or communications network implementation. The problem domain that a Cognitive OSS system attempts to solve may be represented by a network graph. As can be appreciated, a graph that is representative of the Cognitive OSS problem domain may change from one form to another, similar to the topology graph transformations set forth in the present disclosure. As such, a cognitive system may not be able to solve all potential issues using the same cognitive perspective. Accordingly, adaptively changing and/or dynamically selecting different perspectives based on ML/MR in accordance with the teachings herein may lead to less error prone structures and more reliable solutions.

4. As fault management becomes even more complex for networks of tens or even hundreds of devices in environments such as DC networks or service provider networks, example embodiments facilitate a robust and efficient ML-based system that is particularly adaptive to the ever-changing heterogeneous environments that are being to contemplated. It should be appreciated that especially in dynamic environments such as data centers, sometimes too many configurative operations need to be performed for the available services in a short time. Moreover, in these environments, link/node deployment or removal operations may be performed routinely, typically causing significant topology changes. For such dynamic environments, even the network operator may not be able to assess efficiently and accurately what the most up-to-date structure is for fault analysis. With ML-based systems, however, efficient fault management and root cause analysis may be effectuated using example embodiments herein that are adaptive to recognize the changes in topology and provide optimal ML engines as set forth in the present disclosure.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a RAM circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import are recited or described, such a phrase should be understood to mean "only A, only B, or both A and B." Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

What is claimed is:

1. A method of effectuating fault analysis in a network comprising a plurality of nodes, the method comprising:
determining by a topology mapper that at least one of a topological configuration comprised of any of a physical, virtual, or hybrid configuration of the network has changed due to one or more nodes being added, deleted or reconfigured in the network, or a key performance indicator (KPI) requirement of the network has changed based on a threshold;
responsive to determining that the topological configuration of the network has changed or the KPI requirement has changed based on the threshold, identifying a machine language (ML) engine, from a plurality of ML engines used for fault analysis, optimally adapted to facilitate root cause determination of a fault in the network after the topological configuration has changed or the KPI requirement of the network has changed, wherein identifying the ML engine comprises utilizing a ML engine selector that uses topology class information on the topological configuration of the network and an adjacency matrix comprising information on connection of nodes of the network as inputs to apply to a set of rules to select the ML engine from the plurality of ML engines; and
selecting the ML engine to identify the fault in the network.

2. The method as recited in claim 1, wherein the selecting of the ML engine is dynamically predicted and trained corresponding to the topological configuration or the KPI requirement.

3. The method as recited in claim 2, further comprising collecting at least one of topological configuration data and KPI data from the network using Simple Network Management Protocol (SNMP), Network Configuration (NetConf) protocol, Transaction Language 1 (TL1) protocol or OpenFlow protocol.

4. The method as recited in claim 3, further comprising categorizing the plurality of nodes of the network into edge nodes, intermediate nodes and core nodes based on at least one of topological configuration or performance capability of each of the plurality of nodes.

5. The method as recited in claim 4, further comprising classifying network topological configurations into topology classes comprising star topologies, extended star topologies, tree topologies, bus topologies, mesh topologies, ring topologies, extended ring topologies, ring-star hybrid topologies or extended ring-star hybrid topologies.

6. The method as recited in claim 5, further comprising: determining the adjacency matrix for the network based on the topological configuration of the network; and providing the adjacency matrix to the ML engine selector configured to select the optimally adapted ML engine.

7. The method as recited in claim 6, further comprising configuring the network to support a virtual LAN (VLAN) service, a virtual extensible LAN (VXLAN) service, a Multiprotocol Label Switching (MPLS) service, a virtual private routed network (VPRN) service, a virtual private LAN service (VPLS), a Virtual Router Redundancy Protocol (VRRP) redundancy service, or a tunneling service.

8. The method as recited in claim 6, wherein a change in the topological configuration comprises at least one of a physical network topology change and a virtual network topology change.

9. Apparatus for effectuating fault analysis in a network comprising a plurality of nodes, the apparatus, comprising:
a data collector configured to receive from a topology mapper at least one of a topological configuration of the network comprised of any of a physical, virtual, or hybrid configuration, said data collector further configured to determine that the topological configuration has changed due to one or more nodes being added, deleted or reconfigured in the network, or a key performance indicator (KPI) requirement of the network has changed based on a threshold;
a topology and performance manager module, responsive to a determination that the topological configuration of the network has changed or the KPI requirement has changed based on the threshold, configured to identify a machine language (ML) engine, from a plurality of ML engines used for fault analysis, optimally adapted to facilitate root cause determination of a fault in the network after the topological configuration has changed or the KPI requirement of the network has changed wherein such identification of the ML engine comprises utilization of a ML engine selector that uses topology class information on the topological configuration of the network and an adjacency matrix comprising information on connection of nodes of the network as inputs to apply to a set of rules to select the ML engine from the plurality of ML engines; and
said topology and performance manager module operable to select the ML engine to identify the fault in the network.

10. A system configured to effectuate fault analysis in a network comprising a plurality of nodes, the system comprising:
a data collector configured to collect topological configuration data and key performance indicator (KPI) data associated with the network, wherein the network comprises any of a physical, virtual, or hybrid network;
a topology and performance manager (TPM) module coupled to the data collector, the TPM module configured to determine that the a topological configuration has changed due to one or more nodes being added, deleted or reconfigured in the network, or a key performance indicator (KPI) requirement of the network has changed based on a threshold;
a machine language (ML) engine selector coupled to the TPM module, the ML engine selector operative to identify an ML engine based on, responsive to a determination that the topological configuration of the network has changed or the KPI requirement has changed based on the threshold, identifying the ML engine, from a plurality of ML engines used for fault analysis, optimally adapted to facilitate root cause determination of a fault in the network after the topological configuration has changed or the KPI requirement of the network has changed, wherein identifying the ML engine comprises utilizing the ML engine selector that uses topology class information on the topological configuration of the network and an adjacency matrix comprising information on connection of nodes of the network as inputs to apply to a set of rules to select the ML engine from the plurality of ML engines; and
a fault analytics module operative to perform root cause determination of the fault based on the ML engine provided by the ML engine selector, the selected ML engine optimally adapted to facilitate root cause determination of the fault.

11. The system as recited in claim 10, wherein the ML engine selector is configured as part of a Network Operations Center (NOC), an Operations Support System (OSS), a Management and Orchestration (MANO) system or a Kubernetes orchestration system associated with the network.

12. The system as recited in claim 10 wherein the ML engine selector is configured as a rule-based selector for selecting a particular ML engine from a plurality of predetermined ML engines that respectively correspond to different types of network topological configurations and KPI requirements of the network.

13. The system as recited in claim 10 wherein the ML engine selector is configured as a built-in ML-based module for dynamically predicting and training an ML engine corresponding to a topological configuration change or the KPI requirements detected in the network.

14. The system as recited in claim 10, wherein the data collector is operative to collect at least one of topological configuration data and KPI data from the network using Simple Network Management Protocol (SNMP), Network Configuration (NetConf) protocol, Transaction Language 1 (TL1) protocol or OpenFlow protocol.

15. The system as recited in claim 14, wherein a change in the topological configuration detected in the network comprises a physical network topology change, a virtual network topology change or a combination thereof.

* * * * *